United States Patent
Takahashi et al.

(10) Patent No.: US 6,462,115 B1
(45) Date of Patent: *Oct. 8, 2002

(54) WATER REPELLENT COATING COMPOSITION, METHOD FOR PREPARING THE SAME, AND COATING FILMS AND COATED ARTICLES USING THE SAME

(75) Inventors: Masaya Takahashi, Tokorozawa (JP); Susumu Fujimori, Tokyo (JP); Mamoru Ishitani, Matsudo (JP); Taketoshi Matsuura, Mito (JP); Hisao Tabei, Hitachinaka (JP); Yoshiaki Haga, Toukai-mura (JP); Akira Nohara, Mito (JP); Nobuhiro Funakoshi, Naka-machi (JP)

(73) Assignees: Nippon Telegraph and Telephone Corporation, Tokyo (JP); NTT Advanced Technology Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,921

(22) Filed: Aug. 15, 1997

(30) Foreign Application Priority Data

Aug. 16, 1996 (JP) .............................. 8-233716
May 16, 1997 (JP) .............................. 9-143269

(51) Int. Cl.$^7$ .............................. C08K 5/32
(52) U.S. Cl. .............. 524/263; 523/209; 523/212; 523/213; 523/214; 524/261; 428/403; 428/404; 428/405; 428/406; 428/407
(58) Field of Search .............. 523/209, 212, 523/213, 214; 524/263, 261; 428/403, 404, 405, 406, 407, 323, 325, 324, 327, 331, 411.1, 413, 423.1, 421, 480, 500

(56) References Cited

U.S. PATENT DOCUMENTS

| | | | | |
|---|---|---|---|---|
| 3,023,181 A | | 2/1962 | Te Grotenhuis | |
| 3,916,073 A | * | 10/1975 | Horowitz et al. | 428/451 |
| 4,102,703 A | | 7/1978 | Tully | 106/287.14 |
| 4,418,165 A | | 11/1983 | Polmanteer et al. | 523/210 |
| 4,877,451 A | * | 10/1989 | Winnik et al. | 106/23 |
| 4,923,912 A | * | 5/1990 | Sasaki et al. | 523/466 |
| 5,006,573 A | * | 4/1991 | Plueddemann | 523/214 |
| 5,250,637 A | * | 10/1993 | Shiobara et al. | 525/487 |
| 5,352,521 A | * | 10/1994 | Hotta et al. | 428/402 |
| 5,516,557 A | * | 5/1996 | Willnow et al. | 427/358 |
| 5,607,764 A | * | 3/1997 | Konno et al. | 428/327 |
| 5,618,872 A | * | 4/1997 | Pohl et al. | 524/430 |
| 5,641,439 A | * | 6/1997 | Rogerson | 264/46.4 |
| 5,718,772 A | * | 2/1998 | Mori et al. | 136/251 |
| 5,719,206 A | * | 2/1998 | Mihoya et al. | 523/212 |
| 5,766,814 A | * | 6/1998 | Baba et al. | 430/106.6 |
| 5,770,306 A | * | 6/1998 | Suzuki et al. | 428/328 |
| 5,824,421 A | * | 10/1998 | Kobayashi et al. | 428/447 |

FOREIGN PATENT DOCUMENTS

| | | |
|---|---|---|
| EP | 0 052 427 | 5/1982 |
| EP | 0 437 902 | 7/1991 |
| GB | 1194323 | 6/1970 |
| JP | 6-122838 | 5/1994 |
| JP | 07033480 | 2/1995 |
| JP | 07138047 | 5/1995 |
| JP | 07138050 | 5/1995 |
| JP | 07251060 | 10/1995 |

* cited by examiner

Primary Examiner—Blaine Copenheaver
Assistant Examiner—Christopher Paulraj
(74) Attorney, Agent, or Firm—Venable; Robert J. Frank; Ashley J. Wells

(57) ABSTRACT

A water repellent coating composition includes fine particles having functional groups on their surfaces and having a particle diameter ranging from 10 nm to 1 mm; a coupling agent containing (a) a functional group which is capable of reacting with the functional group of the fine particles and (b) a water repellent fluorinated group; a binder resin for binding the fine particles; and a solvent for the binder.

30 Claims, 18 Drawing Sheets

WATER REPELLENT COATING COMPOSITION, METHOD FOR PREPARING THE SAME, AND COATING FILMS AND COATED ARTICLES USING THE SAME

BACKGROUND OF THE INVENTION

1. Field of the Invention

The present invention relates to a water repellent coating composition which is excellent in water repellence, antisnow or ice-sticking property and weatherability, to a method of preparing such a water repellent coating composition, and to coating films and coated articles provided using such a water repellent coating composition.

The water repellent coating composition of the present invention has high water repellence, antisnow- or antiice-sticking properties, and weatherability and can be used for preventing wetting with water, adhesion of dirt or corrosion of coated surfaces. The water repellent coating composition of the present invention can be used widely in various fields including construction, civil engineering, etc.

The present invention is applicable to surface treatment of various antennae, e.g., antennae for satellite communication and satellite broadcasting, antenna domes for communication, antennae for flight control, Yagi antennae and the like in order to prevent wetting with water, adhesion of snow or ice on the surface thereof. Also, the present invention is applicable to surfaces of reflector plates for radars and radiotelescopes, iron towers, cables, transmission lines, constructions and facings thereof, such as houses, buildings, roofs or outer walls thereof, surfaces of vehicles such as electric cars, trains, automobiles, ships, airplanes, front window glasses of such vehicles, jigs for civil engineering machines, ventilation or exhaustion outlets of chimneys and stoves. The water repellent coating composition of the present invention can be provided in the form of a dispersion or contained in a spray can.

2. Description of the Related Art

Development of water repellent coating compositions having excellent water repellence, and concomittantly antisnow- or antiice-sticking property, as well as weatherability will enable realization of antennae, cables, towers, roofs and the like which are resistant to snow-sticking by coating such coating compositions thereon and such coating compositions will find their way into many uses including coating of jigs for civil engineering machines and the like. For this reason, various water repellent coating compositions are under development.

Conventional approaches to improve water repellence of an object such as glass have been to reduce as low as possible the surface energy of an object or material which needs water repellence as by coating the surface thereof with a compound containing a fluoroalkyl group, a compound containing a siloxane group, coating composition or the like or dispersing fine particles of fluoroalkyl group containing compounds in the material.

For example, use has been made of a wet plating method to compound fine particles of polytetrafluoroethylene (PTFE) with nickel metal to develop a water repellent material having water repellence in terms of contact angle of no lower than 150, which latter contact angle is deemed to be a standard of water repellence. This method cannot be applied to constructions or objects outdoors, such as buildings or houses, since the method includes plating which is inapplicable to those outdoor constructions or objects and the applicability of the method depends on the applicability of the wet plating.

Recent development in the art includes a water repellent coating composition containing powder of PTFE having a low molecular weight of 500 to 20,000 and fluorinated even to the terminals of the molecule, dispersed in an acrylic silicone resin or the like as disclosed in Japanese Patent Application Laying-open No. 122838/1994. The coating composition is reported to exhibit excellent water repellence, with a coated surface having an initial contact angle of not lower than 140°. The water repellent coating composition is expensive since it contains as water repellent powder special PTFE powder which is fluorinated to terminals of the molecule, making it difficult to provide such water repellent coating composition competitively and, hence, limiting the scope of its application. In addition, fluororesins including low molecular weight PTFE generally have low intermolecular energy so that their mechanical strength is low and coated surfaces with such resins are vulnerable to abrasion or compression and are less durable. Therefore, they can find their way in only limited applications.

Japanese Patent Application Laying-open No. 33480/1977 discloses a glass substrate with a water repellent layer comprising a porous film containing lower molecular weight PTFE in cavities thereof. In this case, the contact angle of the water repellent layer was about 110°, thus failing to give sufficient water repellence.

Also, Japanese Patent Application Laying-open No.138047/1977 proposes use of a water repellent material containing a metal oxide and a fluororesin on a surface of glass substrate. The contact angle was about 110° and water repellence is insufficient.

The method disclosed in Japanese Patent Application Laying-open No. 138050/1977 uses a sol-gel reaction to form a subbing layer of a metal oxide on a glass substrate and coat a fluororesin thereon. The contact angle was about 110°, which is insufficient.

Further, Japanese Patent Application Laying-open No. 251060/1977 discloses a method of providing a water repellent surface on a substrate by pulverizing water repellent composite powder comprising base particles coated with low molecular weight PTFE, the base particles having mechanical strength greater than the PTFE, and making the pulverisate adhere to a surface of a substrate. The contact angle attained by the method is not smaller than 150°. However, the manufacture of the composite powder is difficult since the method involves the steps of attaching the low molecular weight PTFE having poor adhesion power to the base particles and pulverizing water repellent composite particles having excellent lubrication capability which latter step is complicated. In addition, the resulting coating composition has a poor mechanical strength since the low molecular weight PTFE film tends to be peeled off due to abrasion.

As described above, most of the conventional water repellent coating compositions have disadvantages in that they exhibit insufficient contact angles or exhibit sufficient contact angles only at high cost and manufactured with difficulty.

Further, the conventional coating compositions are also disadvantageous in that they generally produce white opaque coating films so that the color of the underlying layer or material of the coated article cannot seen as is and, hence, their application is limited considerably. In order to cope with this problem, addition of one or more pigments is mandated in order to color the coating film. The addition of such pigment(s) would often deteriorate the water repellence that the composition has inherently.

SUMMARY OF THE INVENTION

Therefore, an object of the present invention is to obviate the problems inherent to the above-described prior art and provide a water repellent coating composition having improved water repellence, anti-abrasion property, antisnow- or antiice-sticking property and weatherability economically.

Another object of the present invention is to provide a transparent coating composition.

Still another object of the present invention is to provide a method of preparing such a transparent coating composition.

Yet another object of the present invention is to provide a coating film.

Further, an object of the present invention is to provide a coated article coated with such a coating composition.

According to a first aspect of the present invention, there is provided a water repellent coating composition comprising:

fine particles having functional groups on their surface;

a coupling agent containing a functional group which is capable of reacting with the functional groups of the fine particles and a functional group; which is water repellent a binder resin for binding the fine particles; and a solvent for the binder.

Here, the fine particles may comprise an inorganic material.

The inorganic material may preferably be one selected from the group consisting of $SiO_2$, $SiO_2$ containing glass, shirasu, siliceous sand, zeolite, silicon carbide, and mixtures thereof.

Also, the fine particles may comprise an organic material.

The organic material may preferably one selected from the group consisting of polymethyl methacrylate, polyurethane resin and mixtures thereof.

The fine particles may comprise an inorganic material and an organic material in combination.

The inorganic material is selected from the group consisting of $SiO_2$, $SiO_2$ containing glass, shirasu, siliceous sand, zeolite, silicon carbide, and mixtures thereof, and the organic material is selected from the group consisting of polymethyl methacrylate, polyurethane resin and mixtures thereof.

The coupling agent may preferably one selected from the group consisting of silane coupling agent having a water repellent group in its molecule and a titanium coupling agent, and mixtures thereof.

The binder resin may preferably one selected from the group consisting of acrylic resin, acrylic silicone resin, acrylic urethane resin, polyester resin, epoxy resin, urethane resin, fluororesin, and mixtures thereof.

According to a second aspect of the present invention, there is provided a water repellent coating composition comprising:

fine particles having functional groups on their surface, the fine particles having a particle diameter of no greater than 1 mm;

a coupling agent containing a functional group which is capable of reacting with the functional groups of the fine particles and a functional group which is water repellent;

a binder resin for binding the fine particles; and a solvent for the binder wherein the fine particles differ from the binder resin in refractive index within ±2% based on the refractive index of the fine particles.

Here, the fine particles may exist in an amount of 10 to 90% based on the weight of the composition after evaporation of the solvent.

According to a third aspect of the present invention, there is provided a method of preparing the above-described transparent water repellent coating composition, comprising the step of treating surfaces of fine particles with a coupling agent.

Here, the fine particles may exist in an amount of 10 to 90% based on the weight of the composition after evaporation of said solvent.

According to a fourth aspect of the present invention, there is provided a method of preparing the above-described transparent water repellent coating composition, comprising the step of mixing said fine particles and said binder in an apparatus utilizing high speed turbulent flow energy.

Here, the fine particles may exist in an amount of 10 to 90% based on the weight of the composition after evaporation of said solvent.

According to a fifth aspect of the present invention, there is provided a method of preparing the above-described transparent water repellent coating composition, comprising the steps of treating surfaces of fine particles with a coupling agent and mixing said fine particles and said binder in an apparatus utilizing high speed turbulent flow energy.

Here, the fine particles may exist in an amount of 10 to 90% based on the weight of the composition after evaporation of said solvent.

According to a sixth aspect of the present invention, there is provided a coated film obtained from the above-described water repellent coating composition.

According to a seventh aspect of the present invention, there is provided a coated article comprising:

a substrate;

a coating film obtained from the above-described water repellent coating composition.

Other and further objects, features and advantages of the present invention will become more apparent from the following description of preferred embodiments with reference to the accompanying drawings.

DETAILED DESCRIPTION OF PREFERRED EMBODIMENTS

The present invention will be understood more fully from the detailed description give hereinafter and from the accompanying drawings of the preferred embodiments of the invention, which, however, should not be taken to be limitative to the present invention, but are for explanation and understanding only.

Figure 1:
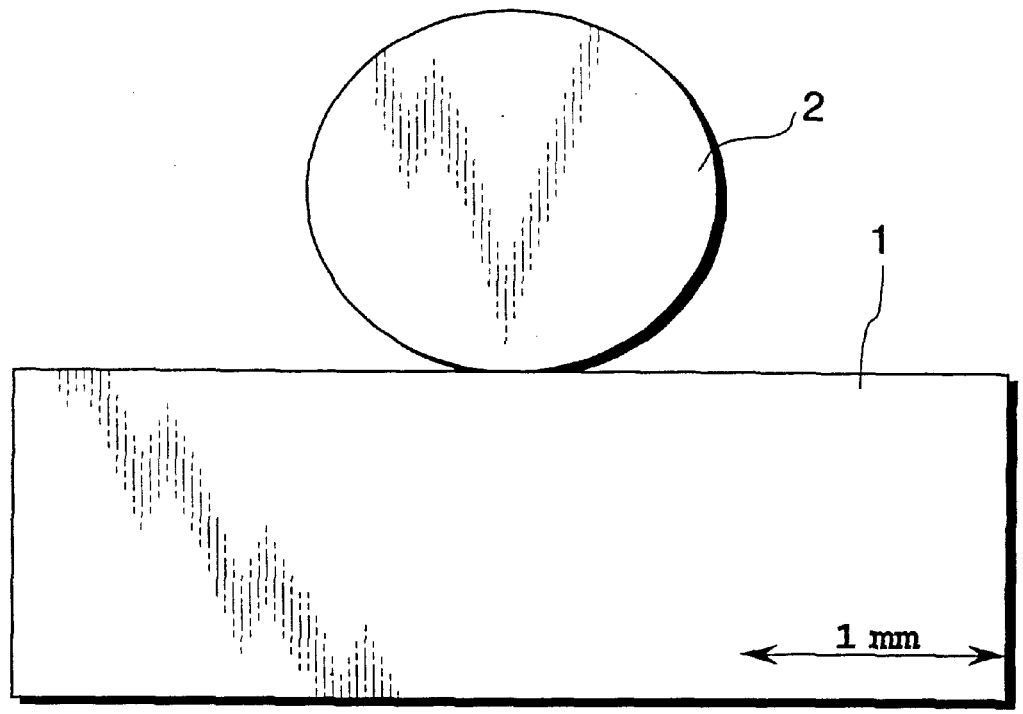
FIG. 1 is a schematic view showing a state of a water droplet on a coating film according to an embodiment of the present invention.
Figure 2:
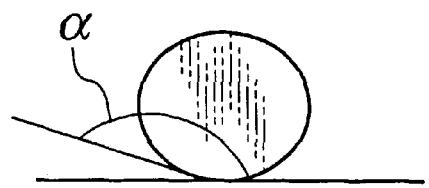
FIG. 2 is a schematic diagram illustrating measurement of contact angle of water.

FIG. 1 shows schematically a water droplet on a coating film according to an embodiment of the present invention, in which a coating film 1 bears a water droplet 2, in other words the water droplet 2 contacts the coating film 1. FIG. 2 is a schematic illustration of how to measure the contact angle of water. In FIG. 2, alpha (α) designates a contact angle of a water droplet.

(1) Fine Particle

Examples of the fine particles which can be used in the water repellent coating composition of the present invention include those which comprise inorganic materials such as $SiO_2$ and various $SiO_2$-containing glass, shirasu, siliceous sand, zeolite, silicon carbide (SiC) and the like singly or in combination, organic materials such as crosslinked polymethyl methacrylate (PMMA), urethane and the like singly or in combination. The inorganic and organic materials may be used in combination. The fine particles can be mixed and dispersed with other components in a solvent in a proportion of 10 to 90% by weight based on the total composition on dry basis after evaporation of the solvent.

Although in examples hereinbelow, use of crosslinked polymethyl methacrylate particles is exemplified as fine particles of polymeric compound or organic material, urethane, which has similar functional groups on its surface, can exhibit similar effects.

(2) Particle Diameter of Fine Particle

Fine particle, one of the components of the water repellent coating composition of the present invention, may generally have a particle diameter of preferably no greater than 1 mm. If the particle diameter exceeds 1 mm, the surface of coating film is coarsened and uneven with high protrusions and deep depressions, thus tending to fail to be useful as a coating film. On the other hand, with a particle diameter of no greater than 10 nm, individual particles tend to agglomerate and are difficult to disperse in a binder uniformly. Therefore, particle diameter does not have to be excessively small. Therefore, use of fine particles with a particle diameter within the ranges of 10 nm to 1 mm give rise to a water repellent coating composition having high performance. Among the particles, those having a particle diameter of 100 nm to 10 μm will produce a coating composition most excellent coating performance.

(3) Coupling Agent

Examples of the coupling agent which can be used in the present invention include silane coupling agents containing a water repellent group in the molecule, titanium coupling agents and the like singly or in combination. The coupling agent is used preferably in amounts of 1 to 50% by weight based on the weight of total composition.

(4) Functional Groups and Coupling Agents Containing the Same

Silane coupling agents are generally expressed as $YRSiX_3$. Those silane coupling agents in which the Y moiety is fluorinated and those in which the R moiety is small in length are excellent in water repellence.

The coupling treatment is based on a principle of bond formation by condensation with dehydration. For example, $C_8F_{17}C_2H_4Si(OC_2H_5)_3$ is hydrolyzed as follows:

$$C_8F_{17}C_2H_4Si(OC_2H_5)_3 + 3H_2O \rightarrow C_8F_{17}C_2H_4Si(OH)_3 + 3C_2H_5OH$$

and then coupling occurs upon condensation with dehydration as follows:

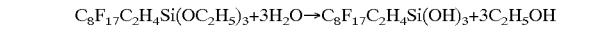

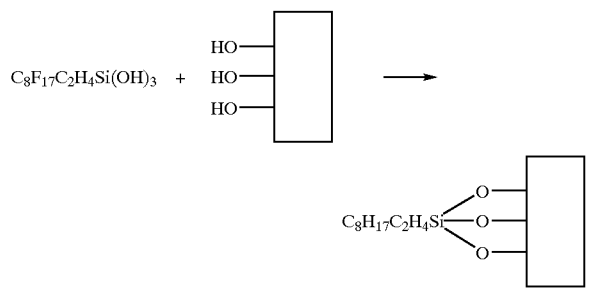

The functional group on the coupling agent includes —OR, —Cl, —$NR_2$ where R is an alkyl group, for example, —$CH_3$, —$C_2H_5$, etc. On the other hand, the functional group on powder (fine particle) includes typically —OH. Materials which contain —OH groups include $SiO_2$, $SiO_2$ containing substances such as various glasses, shirasu (volcanic ash), siliceous sand, etc.

Organic fine particles comprise polymers having many OH or CO groups on the surface thereof, such as polymethyl methacrylate, urethane, etc.

(5) Binder Resin

Examples of the binder resin which can be used in the present invention include acrylic resins, acrylic urethane resins, acrylic silicone resins, polyester resins, epoxy resins, polyurethane resins, fluororesins, etc., and mixtures of two or more of them.

(6) Relationship Between Refractive Indices of Fine Particle and Binder Resin

When it is contemplated to provide a water repellent coating composition having excellent light transmission, it is desirable that the binder resin constituting the coating composition and fine particle contained therein have the same refractive index or different refractive indices but close to each other. This is because scattering of light which occurs on the interface between the fine particle and the binder can be one of the causes of opaqueness of the coating composition. In order to eliminate such a light scattering, it is effective to reduce difference between the optical refractive indices of the fine particle and the binder resin to a lowest possible level. The difference in refractive index between the fine particle and binder resin is preferably within the range of ±2% based on the index of the fine particle.

(7) Additives

The water repellent coating composition of the present invention comprises fine particle, binder resin, and a solvent as major components. However, the coating composition may if desired contain various additives used in conventional coating compositions, such as colorants, antioxidants, ultraviolet light absorbers (UV stabilizers), dispersants such as fluorocarbon oil, lubricants, and the like in amounts which do not harm the intended effect of the water repellent coating composition. The coating composition with one or more of these additives also serves as a water repellent coating composition having a high performance.

(8) Solvent

As for the solvent which can be used in the water repellent coating composition of the present invention, there can be cited organic solvents conventionally used for coating compositions, such as butyl acetate.

(9) Production Method

The water repellent coating composition of the present invention can be prepared in the same manner as conventional coating compositions. More particularly, the fluororesin powder, binder resin and solvents for the binder resin and one or more optional additives are stirred and mixed in a ball mill, sand mill or the like mixing machine.

For providing a water repellent coating composition having transparency as well, it is desirable that the fine particles can exist in an unassociated or dispersed state. With the conventional mixing technique, it was difficult to disperse fine particles in a separated state due to association of fine particles and the particles have considerably large apparent sizes. Further mixing and stirring of the composition in order to dissociate the agglomerated particles results in contamination or scattering of foreign matters such as bubbles into the coating composition. This treatment, however, renders the composition opaque in contradiction to the initial intention. Use of a surface treated amorphous transparent material such as glass as a water repellent fine particle as proposed in Japanese Patent Application No. 233716/1996 generally results in the production of a white opaque coating composition. This is considered attributable to the occurrence of scattering of light on the interface between the binder resin and fine particle.

Therefore, in order to reduce the population of associated particles to a lowest possible level, and efficiently disperse them in the coating composition, the present invention uses a dispersing mixing technique utilizing high speed turbulent flow energy. This method is based on the principle that upon pressurization at a pressure of 200 to 1,500 atms after injection of a fluid containing powder to be divided into a generator provided with an opening of several hundreds $\mu$m, the flow rate of the fluid increases to 200 to 300 m/s in the vicinity of the opening and concomitantly creates a turbulent flow. In a series of behaviors of the liquid, shock wave or cavitation occurs which pulverizes and mix the powder. Utilization of this technique in mixing the transparent water repellent coating composition allows uniform dispersion and mixing of the binder resin and fine particles in the solvent without incorporating foreign matters such as bubbles. Thus, the method of the present invention can produce a water repellent coating composition which can form an excellent light transmittance.

(10) Coating Method

The water repellent coating composition of the present invention may be directly coated in the form of a suspension in a solvent onto a target object or article as by brush coating or it may be stored in a spray can, i.e., a can made of a metal such as aluminum until it is used by spraying. However, the manner of applying the composition of the present invention is not limited particularly and any conventional method for this purpose may be used.

(11) Target Object or Article

Figure 3:
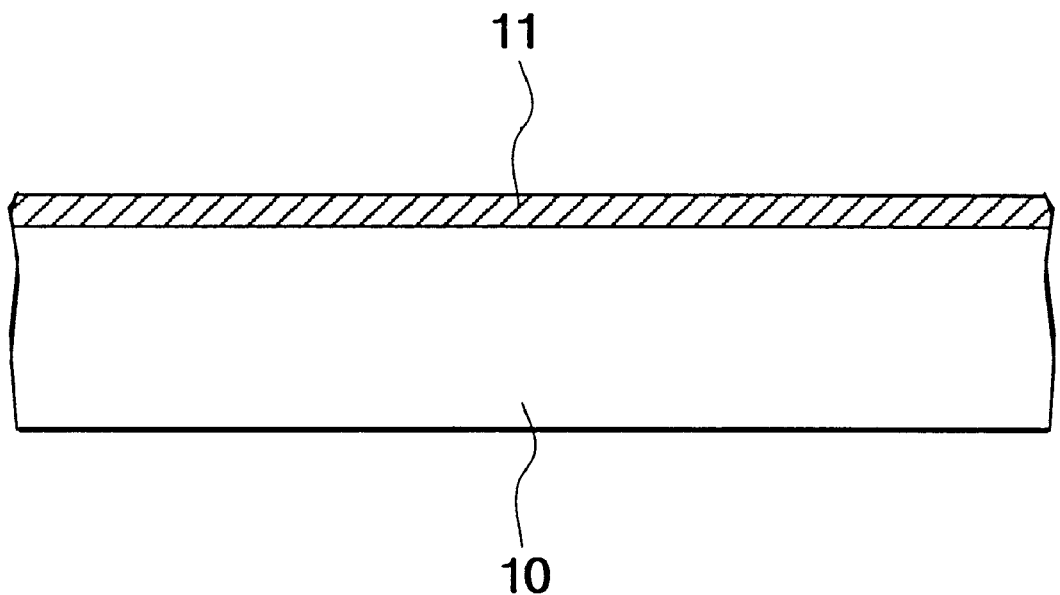
FIG. 3 is a cross sectional view schematically showing a part of a coated article coated with a coating composition according to an embodiment of the present invention.

Target object may be any object or article placed outdoors or used mainly outdoors that are desired to have water repellence, antisnow- or antiice-sticking properties, for example, surfaces of constructions, vehicles, and the like. The coating composition of the present invention can be applied to surfaces of large structures or of sheet-like or plate-like substrates. FIG. 3 is a schematic cross section of a coated article coated with the water repellent coating composition of the present invention. Reference numeral 10 designates a substrate and 11 is a coating film formed from the water repellent coating composition of the present invention. The substrate 10 may be of a sheet- or plate-like form or a part of a surface portion of a large structure or article.

(12) Advantageous Effects

The water repellent coating composition of the present invention exhibits high water repellence and excellent weatherability so that it finds many uses such as prevention of fouling, snow hazards, icing, etc., in various fields including construction, civil engineering, communication systems, and so on.

More particularly, the water repellent coating composition of the present invention can be used in surface treatment for preventing leakage of water or antisnow- or antiice-sticking for various antennae, e.g., antennae for satellite communication and satellite broadcasting, antenna domes for communication, antennae for flight control, Yagi antennae and the like. Application of the water repellent coating composition to these antennae will obviate problems inherent to such antennae of deterioration of quality of transmission and reception caused by noises due to leakage of water, sticking of snow or ice, or the like. Also, when applied to reflector plates for radars and radiotelescopes, the water repellent coating composition of the present invention prevents an increase in noise level due to leakage of water or sticking of snow or ice, thus ensuring high precision observation or measurement. Further, iron towers, cables, transmission lines, protected with the water repellent coating composition of the present invention, will be free of possibilities of sticking of snow or ice thereto and thus of falling of such snow or ice falling therefrom so that dangers to houses or passers-by can be avoided. Similar advantageous effects can be obtained when the coating composition of the present invention is applied to constructions and facings thereof, such as houses, buildings, roofs or outer walls thereof. Also, application of the water repellent coating composition of the present invention to surfaces of the vehicles such as electric cars, trains, automobiles, ships, airplanes, and the like is useful not only for the prevention of the occurrence of dangers but also for saving fuel cost. Further, use of the coating composition of the present invention for coating ventilation or exhaustion outlets of chimneys and stoves effectively prevents clogging of the outlets due to icing.

The water repellent coating composition of the present invention can be provided in the form of a dispersion or as contained in a spray can for general purpose so that it is economical and easy to handle. Further, the composition of the present invention is advantageous as a coating composition since the components can be mixed well easily and will not separate soon. Therefore, it is only necessary to stir the mixture to a minimum extent before the composition of the present invention can be used. When colored materials are desired, pigments can be mixed with ease to form colored coating compositions with excellent color quality since pigments can be dispersed uniformly in the composition of the invention.

EXAMPLES

Hereafter, the present invention will be described more concretely by examples and comparative examples. However, the present invention should not be understood as being limited to the examples.

In the examples and comparative examples, the kind of fluororesin powder and the method for the measurement of the contact angles of coating films are shown in Table 1 below and the following explanation.

In the examples and comparative examples, contact angles were determined by the following methods.
Measurement of Contact Angles of Water Contact angles were determined by dropping 4 microliters of deionized water on a dry coating film surface formed from a water repellent coating and measuring angles using an automatic contact angle meter of CA-Z model manufactured by KYOWA KAIMEN KAGAKU CO., LTD. Measurements were conducted at room temperature (23° C.) five times each and average of five points were used.

Example 1

20 g of glass powder, i.e., pulverized quarts glass, having a particle diameter of not greater than 6 μm as a fine particle, 10 g of 2-(n-perfluoro-octyl)ethyltriethoxysilane (n-$C_8F_{17}C_2H_4Si(OC_2H_5)_3$) as a coupling agent, 20 g of Zeffle (trade name for a product of Daikin Kogyo K.K.; solids content: 42 wt. %) as a binder resin, 1 g of water, and 150 g of butyl acetate as a solvent were mixed in a ball mill at 200 rpm for 1 hour. Well mixed composition was coated on a glass substrate with a spray gun. The coating film had a film thickness of 13 μm after drying the volatile components. The contact angle of the coating film was measured to be 156°.

Example 2

20 g of Aerosil (200 (standard preparation) by Nippon Aerosil, silica powder with an average particle diameter of 12 nm) as a fine particle, 10 g of 2-(n-perfluorooctyl) ethyltriethoxysilane (n-$C_8F_{17}C_2H_4Si(OC_2H_5)_3$) as a coupling agent, 20 g of Zeffle (trade name for a product of Daikin Kogyo K.K.; solids content: 42 wt. %) as a binder resin, 1 g of water, and 150 g of butyl acetate as a solvent were mixed in a ball mill at 200 rpm for 1 hour. Well mixed composition was coated on a glass substrate with a spray gun. The coating film had a film thickness of 15 μm after drying the volatile components. The contact angle of the coating film was measured to be 153°.

Example 3

50 g of shirasu (volcanic ash with an average particle diameter of 6 μm, Shirakkusu Co., Ltd.) was used as a fine particle and Plane Act FC-2 (aluminum compound, Ajinomoto Corporation) was used as a coupling agent. As a method of applying the coupling agent onto the surface of shirasu, a mixed solution of 10 g of the coupling agent, 100 g of ethyl alcohol and 10 g of water prepared in advance was sprayed uniformly on to surfaces of shirasu while stirring the latter. 20 g of the mixed solution was sprayed and the ethyl alcohol and water were removed sufficiently followed by drying at 120° C. for 1 hour to complete the coupling treatment of shirasu.

20 g of the thus-treated shirasu as a fine particle, 20 g of Zeffle (trade name for a product of Daikin Kogyo K.K.; solids content: 42 wt. %) as a binder resin, and 100 g of butyl acetate as a solvent were mixed in a ball mill at 200 rpm for 1 hour. Well mixed composition was coated on a glass substrate with a spray gun. The coating film had a film thickness of 15 μm after drying the volatile components. The contact angle of the coating film was measured to be 153°.

Example 4

50 g of silicon carbide (SiC) was used as a fine particle and 2-(n-perfluorooctyl)ethyltriethoxysilane (n-$C_8F_{17}C_2H_4Si(OC_2H_5)_3$) as a coupling agent, 20 g of Zeffle (trade name for a product of Daikin Kogyo K.K.; solids content: 42 wt. %) was used as a coupling agent. As a method of applying the coupling agent onto the surface of silicon carbide, a mixed solution of 10 g of the coupling agent, 100 g of ethyl alcohol and 10 g of water prepared in advance was sprayed uniformly on to surfaces of silicon carbide while stirring the latter. 20 g of the mixed solution was sprayed and the ethyl alcohol and water were removed sufficiently followed by drying at 120° C. for 1 hour to complete the coupling treatment of silicon carbide.

20 g of the thus-treated silicon carbide as a fine particle, 20 g of Zeffle (trade name for a product of Daikin Kogyo K.K.; solids content: 42 wt. %) as a binder resin, and 100 g of butyl acetate as a solvent were mixed in a ball mill at 200 rpm for 1 hour. Well mixed composition was coated on a glass substrate with a spray gun. The coating film had a film thickness of 15 μm after drying the volatile components. The contact angle of the coating film was measured to be 148°.

Example 5

15 g of crosslinked polymethyl methacrylate (powder with an average particle diameter of no greater than 5 μm) as a fine particle, and 10 g of 2-(n-perfluorooctyl) ethyltriethoxysilane (n-$C_8F_{17}C_2H_4Si(OC_2H_5)_3$) as a coupling agent, 20 g of Zeffle (trade name for a product of Daikin Kogyo K.K.; solids content: 42 wt. %), 1 g of water and 130 g of butyl acetate as a solvent were mixed in a ball mill at 200 rpm for 1 hour. Well mixed composition was coated on a glass substrate with a spray gun. The coating film had a film thickness of 15 μm after drying the volatile components. The contact angle of the coating film was measured to be 145°.

Comparative Example 1

20 g of Aerosil (200 (standard preparation) by Nippon Aerosil, silica powder with an average particle diameter of 12 nm) as a fine particle, 20 g of Zeffle (trade name for a product of Daikin Kogyo K.K.; solids content: 42 wt. %) as a binder resin, and 130 g of butyl acetate as a solvent were mixed in a ball mill at 200 rpm for 1 hour. Well mixed composition was coated on a transparent glass substrate with a spray gun. The coating film had a film thickness of 13 μm after drying the volatile components. The contact angle of the coating film was measured to be no greater than 30°.

Comparative Example 2

20 g of shirasu (volcanic ash with an average particle diameter of 6 μm, Shirakkusu Co., Ltd.) as a fine particle, 20 g of Zeffle (trade name for a product of Daikin Kogyo K.K.; solids content: 42 wt. %) as a binder resin, and 100 g of butyl acetate as a solvent were mixed in a ball mill at 200 rpm for 1 hour. Well mixed composition was coated on a glass substrate with a spray gun. The coating film had a film thickness of 15 μm after drying the volatile components. The contact angle of the coating film was measured to be no greater than 30°.

The samples of the examples and comparative examples above were measured for contact angle and the results obtained are shown in Table 1 below.

Example 6

50 g of ground silica glass (refractive index: 1.460) with an average particle diameter of 8 μm was used as a fine particle and 2-(n-perfluorooctyl)ethyltriethoxysilane (n-$C_8F_{17}C_2H_4Si(OC_2H_5)_3$) was used as a coupling agent. As a method of applying the coupling agent onto the surface of silica glass, a mixed solution of 10 g of the coupling agent, 80 g of ethyl alcohol and 10 g of water was prepared in advance and silica glass (20 g) was dipped in the mixed solution and stirred for 60 minutes. Then, the silica glass and the mixed solution were separated by filtration. The filtered silica glass was dried sufficiently and further dried at 120° C. for 1 hour to complete the coupling treatment of silica glass.

20 g of the thus-treated silica glass as a fine particle, 20 g of Zeffle (solvent evaporation type, refractive index (1.458), trade name for a product of Daikin Kogyo K.K.; solids content: 42 wt. %) as a binder resin, and 100 g of butyl acetate as a solvent were pre-mixed in a ball mill for 1 hour. Then, the mixture was charged in a mixer utilizing a high speed turbulent flow energy (Nanomaker, produced by Miracle Co. Ltd.) and dispersed uniformly.

Well mixed composition was bar-coated on a transparent glass substrate. The coating film had a film thickness of 5 μm after drying the volatile components. The coating film had a contact angle of 150° and a light transmittance at 550 nm of 44%. The difference in refractive index between the binder resin and fine particle was 0.14%.

In comparison, the same composition as described above except that the mixture was mixed only in a ball mill for 2 hours had a light transmittance of 24%.

TABLE 1

| Sample | Fine Particle | Coupling Agent | Binder Resin | Solvent | Method | Contact Angle |
|---|---|---|---|---|---|---|
| Example 1 | Silica glass | 2-(n-perfluorooctyl-ethyltriethoxysilane | Zeffle | Butyl acetate | Ball Mill | 156° |
| Example 2 | Aerosil | 2-(n-perfluorooctyl-ethyltriethoxysilane | Zeffle | Butyl acetate | Ball Mill | 153° |
| Example 3 | Shirasu | Plane Act FC-2 | Zeffle | Butyl acetate | Ball Mill | 153° |
| Example 4 | Silicon carbide | 2-(n-perfluorooctyl-ethyltriethoxysilane | Zeffle | Butyl acetate | Ball Mill | 148° |
| Example 5 | PMMA | 2-(n-perfluorooctyl-ethyltriethoxysilane | Zeffle | Butyl acetate | Ball Mill | 145° |
| Comparative Example 1 | Aerosil | | Zeffle | Butyl acetate | Ball Mill | less than 30° |
| Comparative Example 2 | Shirasu | | Zeffle | Butyl acetate | Ball Mill | less than 30° |

As described above, the water repellent coating composition of the present invention, which preferably comprises as essential ingredients fine particles with a particle diameter of 1 mm, a coupling agent containing one or more water repellent functional groups in the molecule, a binder resin which binds the fine particles, and a solvent for the binder resin, provides a super repellent coating film having a contact angle of no smaller than 145° due to the action of the water repellent coupling agent and minute unevenness in the coating film formed by the fine particles contained therein.

The water repellent coating compositions of Examples 1 to 5 above exhibit high contact angles, e.g., not smaller than 145° and the coating films formed therefrom have high hardness. The coating films with a decreased thickness and a refractive index matched with the binder tend to have an increased light transmittance.

Example 7

50 g of Aerosil (200 (standard preparation) by Nippon Aerosil, silica powder with an average particle diameter of 12 nm, refractive index: 1.460) was used as a fine particle and titanium coupling agent was used as a coupling agent. As a method of applying the coupling agent onto the surface of Aerosil, a mixed solution of 10 g of the coupling agent, 80 g of ethyl alcohol and 10 g of water was prepared in advance and Aerosil was dipped in the mixed solution and stirred for 60 minutes. Thereafter, the Aerosil and the mixed solution were separated by filtration. The filtered Aerosil was dried sufficiently and further dried at 120° C. for 1 hour to complete the coupling treatment of Aerosil.

10 g of the thus-treated Aerosil as a fine particle, 20 g of Zeffle (solvent evaporation type, refractive index (1.458), trade name for a product of Daikin Kogyo K.K.; solids content: 42 wt. %) as a binder resin, and 100 g of butyl acetate as a solvent were pre-mixed in a ball mill for 1 hour. Then, the mixture was charged in a mixer utilizing a high speed turbulent flow energy (Nanomaker, produced by Miracle Co. Ltd.) and dispersed uniformly.

Well mixed composition was bar-coated on a transparent glass substrate. The coating film had a film thickness of 5 μm after drying the volatile components. The coating film had a contact angle of 153° and a light transmittance at 550 nm of 60%. The difference in refractive index between the binder resin and fine particle was 0.14%.

In comparison, the same composition as described above except that the mixture was mixed only in a ball mill for 2 hours had a light transmittance of 29%.

Example 8

50 g of Aerosil (200 (standard preparation) by Nippon Aerosil, silica powder with an average particle diameter of 12 nm, refractive index: 1.460) was used as a fine particle and 2-(n-perfluoro-octyl)ethyltriethoxysilane (n-$C_8F_{17}C_2H_4Si(OC_2H_5)_3$) was used as a coupling agent. As a method of applying the coupling agent onto the surface of Aerosil, a mixed solution of 10 g of the coupling agent, 80 g of ethyl alcohol and 10 g of water was prepared in advance and Aerosil was dipped in the mixed solution and stirred for 60 minutes. Thereafter, the Aerosil and the mixed solution were separated by filtration. The filtered Aerosil was dried sufficiently and further dried at 120° C. for 1 hour to complete the coupling treatment of Aerosil.

6 g of the thus-treated Aerosil as a fine particle, 20 g of Zeffle 2 (curing agent compounded type, refractive index (1.453), trade name for a product of Daikin Kogyo K.K.; solids content: 42 wt. %) as a binder resin, and 100 g of butyl acetate as a solvent were pre-mixed in a ball mill for 1 hour. Then, the mixture was charged in a mixer utilizing a high speed turbulent flow energy (Nanomaker, produced by Miracle Co. Ltd.) and dispersed uniformly.

Well mixed composition was bar-coated on a transparent glass substrate. The coating film had a film thickness of 6 μm after drying the volatile components. The coating film had a contact angle of 152° and a light transmittance at 550 nm of 68%. The difference in refractive index between the binder resin and fine particle was 0.48%.

In comparison, the same composition as described above except that the mixture was mixed only in a ball mill for 2 hours had a light transmittance of 31%.

Example 9

50 g of shirasu (volcanic ash with an average particle diameter of 6 μm, Shirakkusu Co., Ltd.; silica content: 70%, refractive index: 1.47) was used as a fine particle and 2-(n-perfluorooctyl)ethyltriethoxysilane (n-$C_8F_{17}C_2H_4Si(OC_2H_5)_3$) was used as a coupling agent. As a method of applying the coupling agent onto the surface of shirasu, a mixed solution of 10 g of the coupling agent, 80 g of ethyl alcohol and 10 g of water was prepared in advance and shirasu was dipped in the mixed solution and stirred for 60 minutes. Thereafter, the shirasu and the mixed solution were separated by filtration. The filtered shirasu was dried sufficiently and further dried at 120° C. for 1 hour to complete the coupling treatment of Aerosil.

10 g of the thus-treated shirasu as a fine particle, 20 g of Zeffle (solvent evaporation type, refractive index (1.458), trade name for a product of Daikin Kogyo K.K.; solids content 42 wt. %) as a binder resin, and 100 g of butyl acetate as a solvent were pre-mixed in a ball mill for 1 hour. Then, the mixture was charged in a mixer utilizing a high speed turbulent flow energy (Nanomaker, produced by Miracle Co. Ltd.) and dispersed uniformly.

Well mixed composition was bar-coated on a transparent glass substrate. The coating film had a film thickness of 8 μm after drying the volatile components. The coating film had a contact angle of 151° and a light transmittance at 550 nm of 40%. The difference in refractive index between the binder resin and fine particle was 0.82%.

In comparison, the same composition as described above except that the mixture was mixed only in a ball mill for 2 hours had a light transmittance of 28%.

Comparative Example 3

50 g of Aerosil (200 (standard preparation) by Nippon Aerosil, silica powder with an average particle diameter of 12 nm, refractive index: 1.460) was used as a fine particle and 2-(n-perfluorooctyl)ethyltriethoxysilane (n-$C_8F_{17}C_2H_4Si(OC_2H_5)_3$) was used as a coupling agent. As a method of applying the coupling agent onto the surface of Aerosil, a mixed solution of 10 g of the coupling agent, 80 g of ethyl alcohol and 10 g of water was prepared in advance and Aerosil was dipped in the mixed solution and stirred for 60 minutes. Thereafter, the Aerosil and the mixed solution were separated by filtration. The filtered Aerosil was dried sufficiently and further dried at 120° C. for 1 hour to complete the coupling treatment of Aerosil.

6 g of the thus-treated Aerosil as a fine particle, 20 g of transparent acrylic resin (solvent evaporation type, refractive index (1.501), solids content: 17 wt. %) as a binder resin, and 100 g of butyl acetate as a solvent were mixed in a ball mill at 200 rpm for 1 hour.

Well mixed composition was bar-coated on a transparent glass substrate. The coating film had a film thickness of 6 μm after drying the volatile components. The coating film had a contact angle of 150° and a light transmittance at 550 nm of 8%. The difference in refractive index between the binder resin and fine particle was 2.8%.

Comparative Example 4

50 g of Aerosil (200 (standard preparation) by Nippon Aerosil, silica powder with an average particle diameter of 12 nm, refractive index: 1.460) was used as a fine particle and a titanium coupling agent was used as a coupling agent. As a method of applying the coupling agent onto the surface of Aerosil, a mixed solution of 10 g of the coupling agent, 80 g of ethyl alcohol and 10 g of water was prepared in advance and Aerosil was dipped in the mixed solution and stirred for 60 minutes. Thereafter, the Aerosil and the mixed solution were separated by filtration. The filtered Aerosil was dried sufficiently and further dried at 120 ° C. for 1 hour to complete the coupling treatment of Aerosil.

6 g of the thus-treated Aerosil as a fine particle, 20 g of transparent urethane resin (curing agent contained type, refractive index (1.508), solids content: 42 wt. %) as a binder resin, and 100 g of butyl acetate as a solvent were pre-mixed in a ball mill for 1 hour and charged in a mixer utilizing a high speed turbulent flow energy (Nanomaker, produced by Miracle Co. Ltd.) and dispersed uniformly.

Well mixed composition was bar-coated on a transparent glass substrate. The coating film had a film thickness of 6 μm after drying the volatile components. The coating film had a contact angle of 150° and a light transmittance at 550 nm of 10%. The difference in refractive index between the binder resin and fine particle was 3.3%.

The contact angle and light transmittance at 550 nm of the samples of Examples 6–9 and Comparative Examples 3 and 4 are shown in Table 2 below.

TABLE 2

| Sample | Fine Particle | Binder Resin | Difference in Refractive Index (%) | Contact Angle (°) | Light Transmittance (%) |
|---|---|---|---|---|---|
| Example 6 | Silica glass<br>(High Speed Turbulent Flow)<br>(Ball Mill) | Zeffle | <br>0.14<br>0.14 | <br>150<br>150 | <br>44<br>24 |
| Example 7 | Aerosil<br>(High Speed Turbulent Flow)<br>(Ball Mill) | Zeffle | <br>0.14<br>0.14 | <br>153<br>153 | <br>60<br>29 |
| Example 8 | Aerosil<br>(High Speed Turbulent Flow)<br>(Ball Mill) | Zeffle 2 | <br>0.48<br>0.48 | <br>152<br>152 | <br>68<br>31 |
| Example 9 | Shirasu<br>(High Speed Turbulent Flow)<br>(Ball Mill) | Zeffle | <br>0.82<br>0.82 | <br>151<br>151 | <br>40<br>28 |
| Comparative Example 3 | Aerosil<br>(High Speed Turbulent Flow) | Acrylic Resin | 2.8 | 150 | 8 |
| Comparative Example 4 | Aerosil<br>(High Speed Turbulent Flow) | Urethane | 3.3 | 150 | 10 |

Example 10
Parabola Antenna

Figure 4:
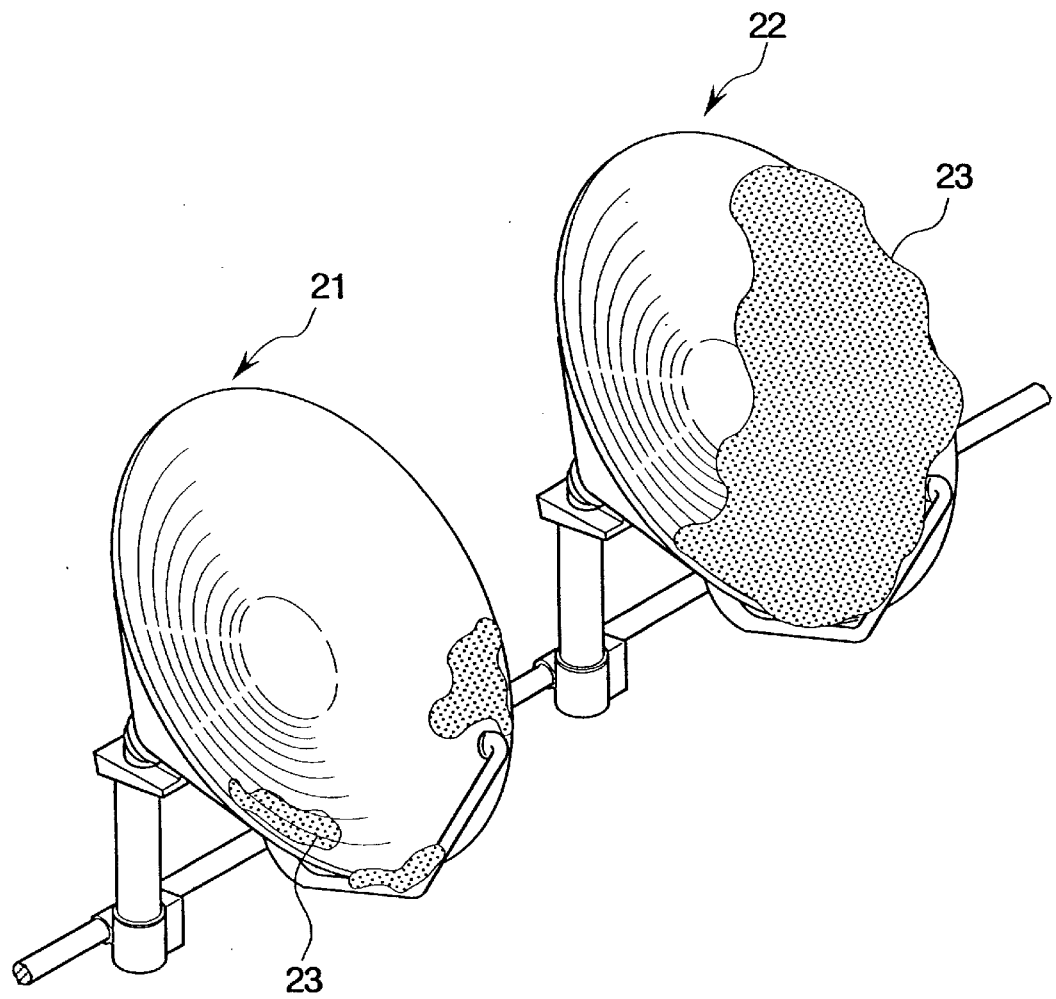
FIG. 4 s a schematic perspective view showing a coated antenna according to an embodiment of the present invention and a comparative uncoated antenna.

The water repellent coating compositions of Examples 1 to 9 each were coated onto a parabola antenna for satellite broadcasting as shown in FIG. 4. In FIG. 4, reference numeral 21 designates a coated parabola antenna and 22 is an uncoated parabola antenna. As shown, only a small amount of snow 23 deposited on a portion of the coated parabola antenna where wind swirled to form a snowdrift. In contrast, the parabola antenna 22 had much snow deposited on at least about 50% of the reception surface.

Example 11
Radome

Figure 5:
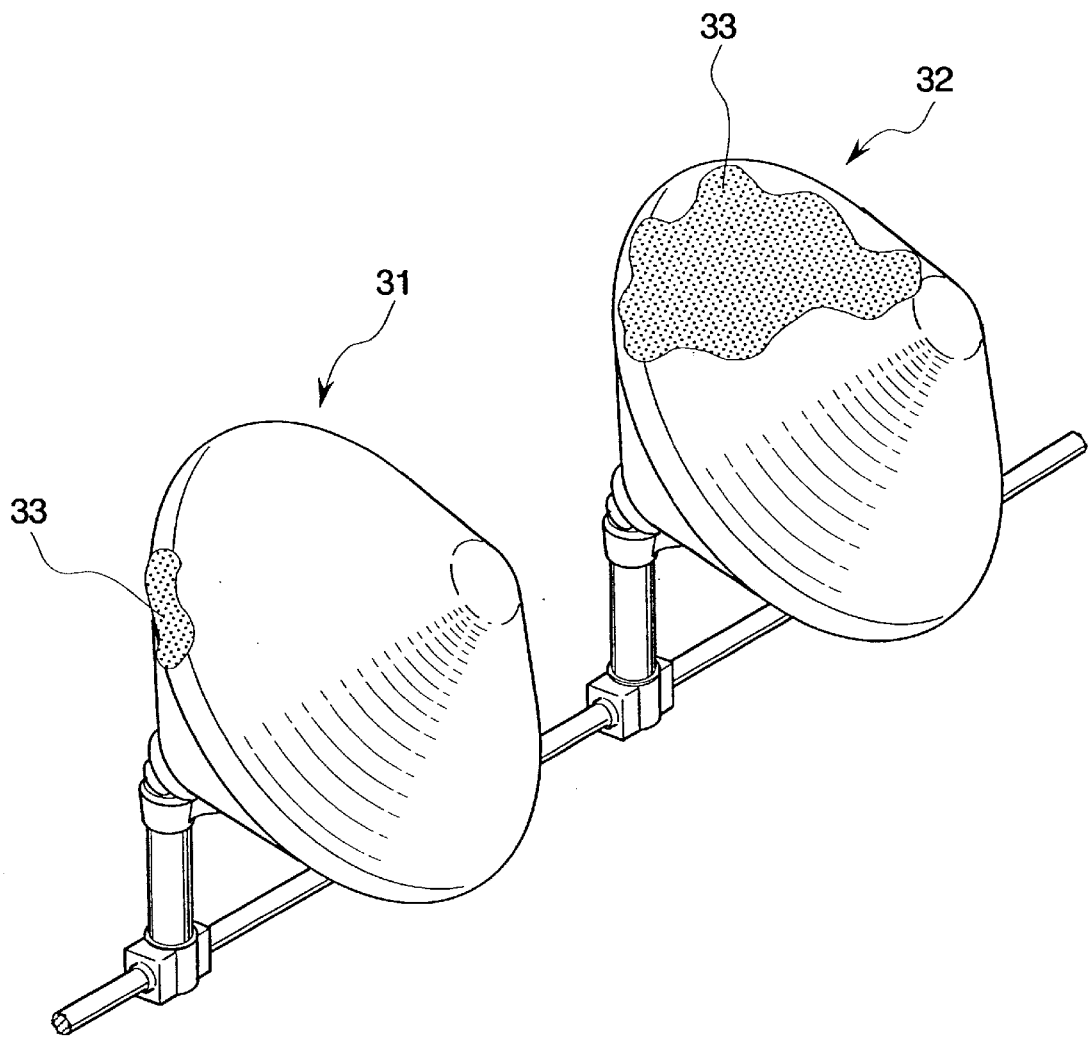
FIG. 5 is a schematic perspective view showing a coated radome according to an embodiment of the present invention and a comparative uncoated radome.

The water repellent coating compositions of Examples 1 to 9 each were coated onto a radome for antennae for radio communication as shown in FIG. 5. In FIG. 5, reference numeral 31 designates a coated radome and 32 is an uncoated radome. As shown in FIG. 5, a small amount of snow or ice 33 deposited only on a peripheral portion of the surface of the coated radome 31 while much snow or ice 33 deposited on the surface of the uncoated radome 32 covering the reception portion.

Example 12
Yagi Antenna

Figure 6:
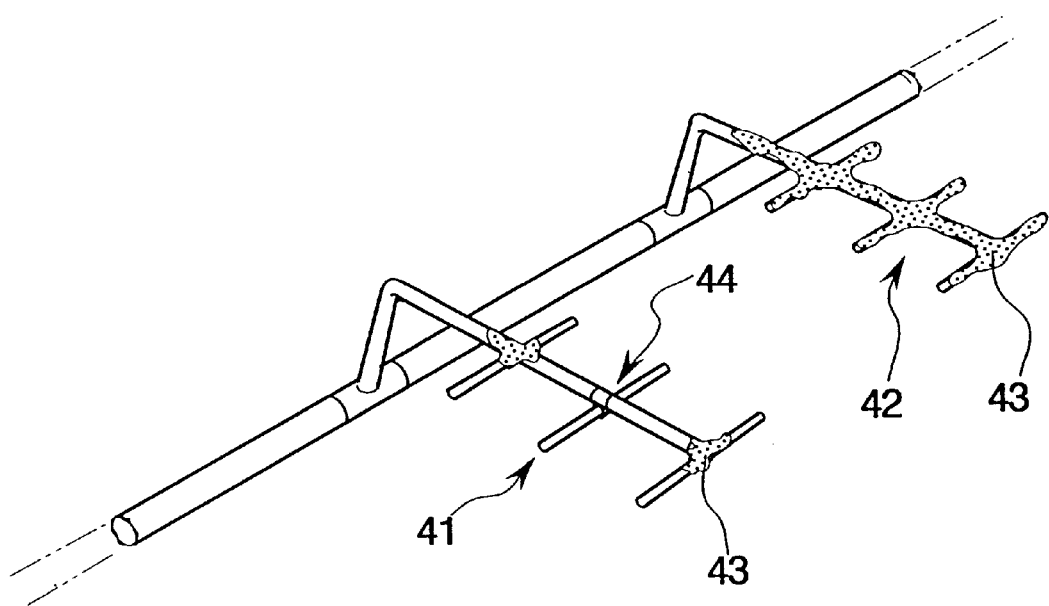
FIG. 6 is a schematic perspective view showing a coated Yagi antenna according to an embodiment of the present invention and a comparative uncoated Yagi antenna.

The water repellent coating compositions of Examples 1 to 9 each were coated onto a Yagi antenna for flight control as shown in FIG. 6. In FIG. 6, reference numeral 41 designates a coated Yagi antenna and 42 is an uncoated Yagi antenna. As shown, only a small amount of snow or ice 43 deposited on portions 44 of the coated Yagi antenna 41 where forks are connected. In contrast, the uncoated Yagi antenna 42 had much snow deposited all over the surfaces.

Example 13
Transmission Line

Figure 7:
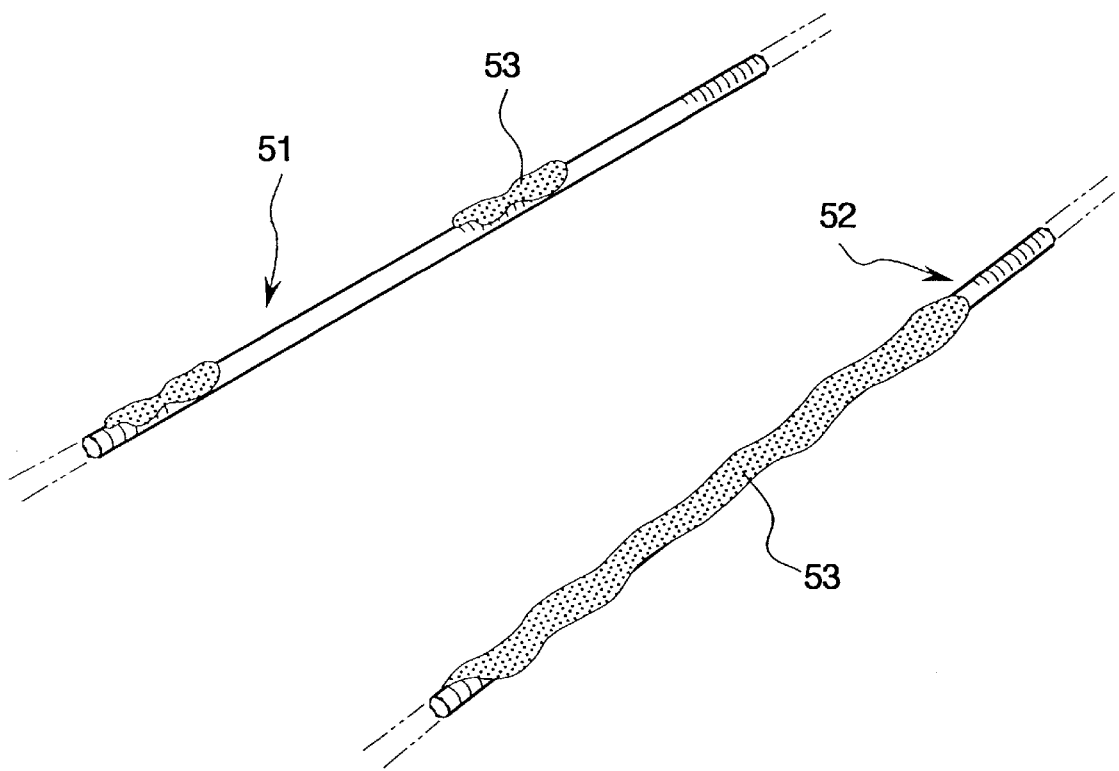
FIG. 7 is a schematic perspective view showing a coated transmission line according to an embodiment of the present invention and a comparative uncoated transmission line.

The water repellent coating compositions of Examples 1 to 9 each were coated onto a transmission line as shown in FIG. 7. In FIG. 7, reference numeral 51 designates a coated transmission line and 52 is an uncoated transmission line. As shown, only a small amount of snow or ice 53 deposited on a portion of the coated transmission line only intermittently. In contrast, the uncoated transmission line 52 had much snow or ice 53 deposited cylindrically on the line 52.

Example 14
Iron Tower

Figure 8:
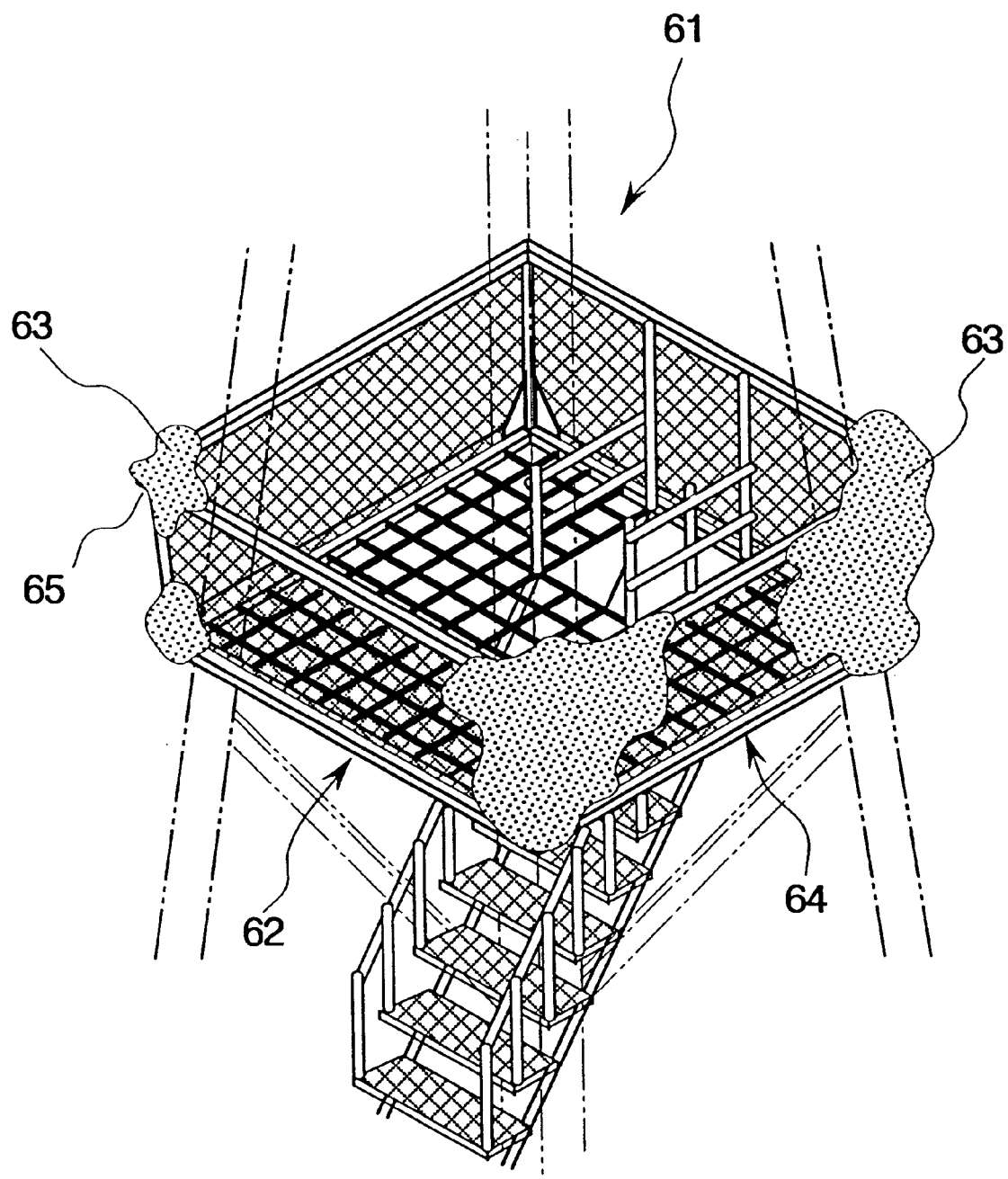
FIG. 8 is a schematic perspective view showing a part of an iron tower having a coated portion according to an embodiment of the present invention and a comparative uncoated portion.

The water repellent coating compositions of Examples 1 to 9 each were coated onto an iron tower as shown in schematic perspective in FIG. 8. In FIG. 8, reference numeral 61 is an iron tower, 62 is a coated portion of a fence surrounding a landing of a stairway provided with the iron tower 61, 63 is snow, and 64 is an uncoated portion of the fence, and 65 is a corner of the fence. As shown, only a small amount of snow 63 deposited on the corner 65 of the coated fence portion 62 (left hand side in the Figure). In contrast, the uncoated fence portion 64 (right hand side in the Figure) had much snow deposited on major portions of the fence including the corner 65.

Example 15
Outer Wall of Building

Figure 9:
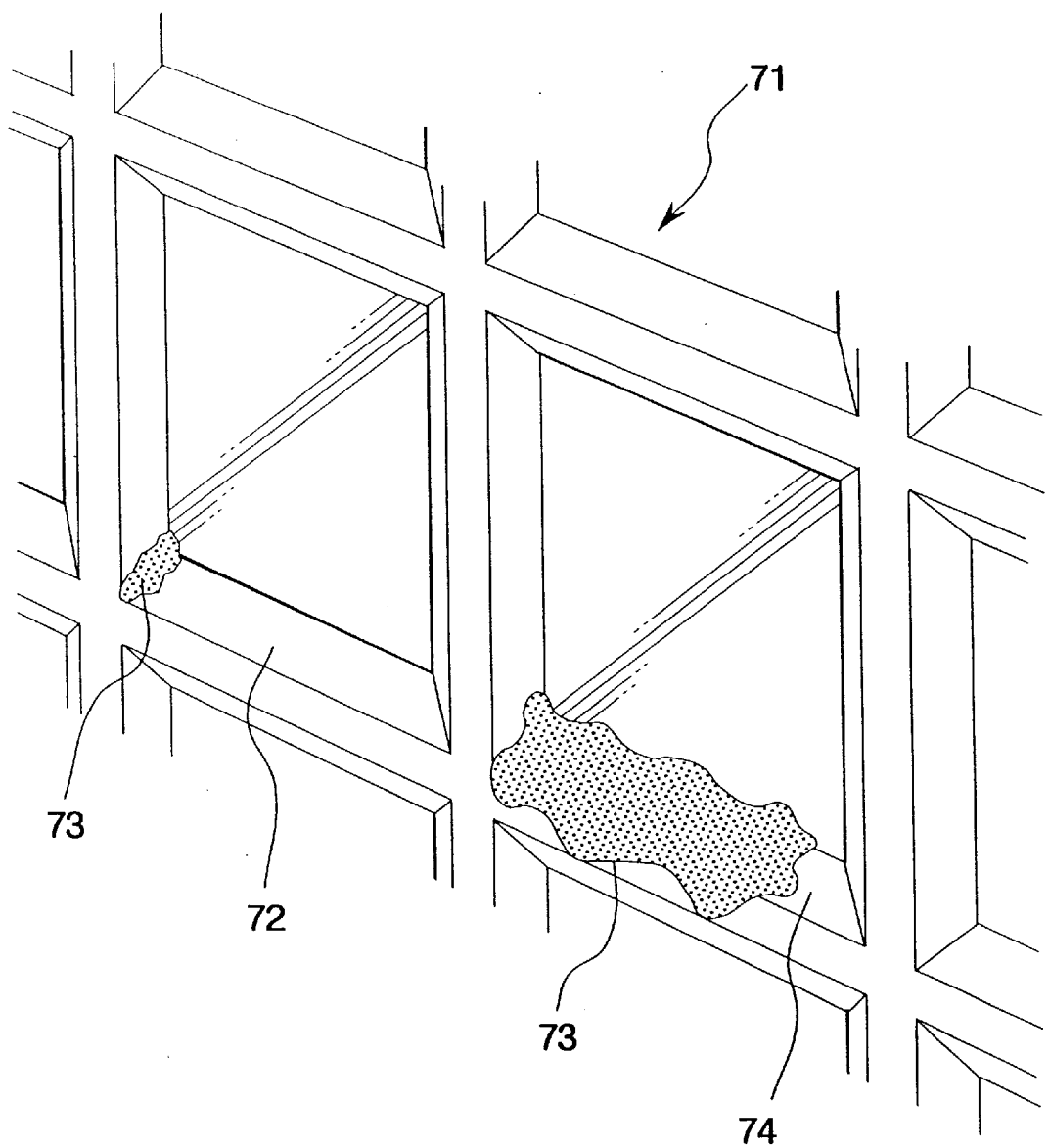
FIG. 9 is a schematic perspective view showing a part of an outer wall of a building having a coated portion according to an embodiment of the present invention and a comparative uncoated portion.

The water repellent coating compositions of Examples 1 to 9 each were coated onto an outer wall of a building as shown in a schematic perspective view in FIG. 9. In FIG. 9, reference numeral 71 designates an outer wall of a building, 72 is a coated window frame portion of the outer wall 71, 73 is snow or ice, 74 is an uncoated window frame portion of the outer wall 71, and 75 is a stool of the window. As shown, only a small amount of snow 73 deposited on a corner of the coated window stool 75 of the outer wall 71. In contrast, the uncoated window frame portion 74 had much snow deposited all over the surface thereof.

Example 16
Roof of House

Figure 10:
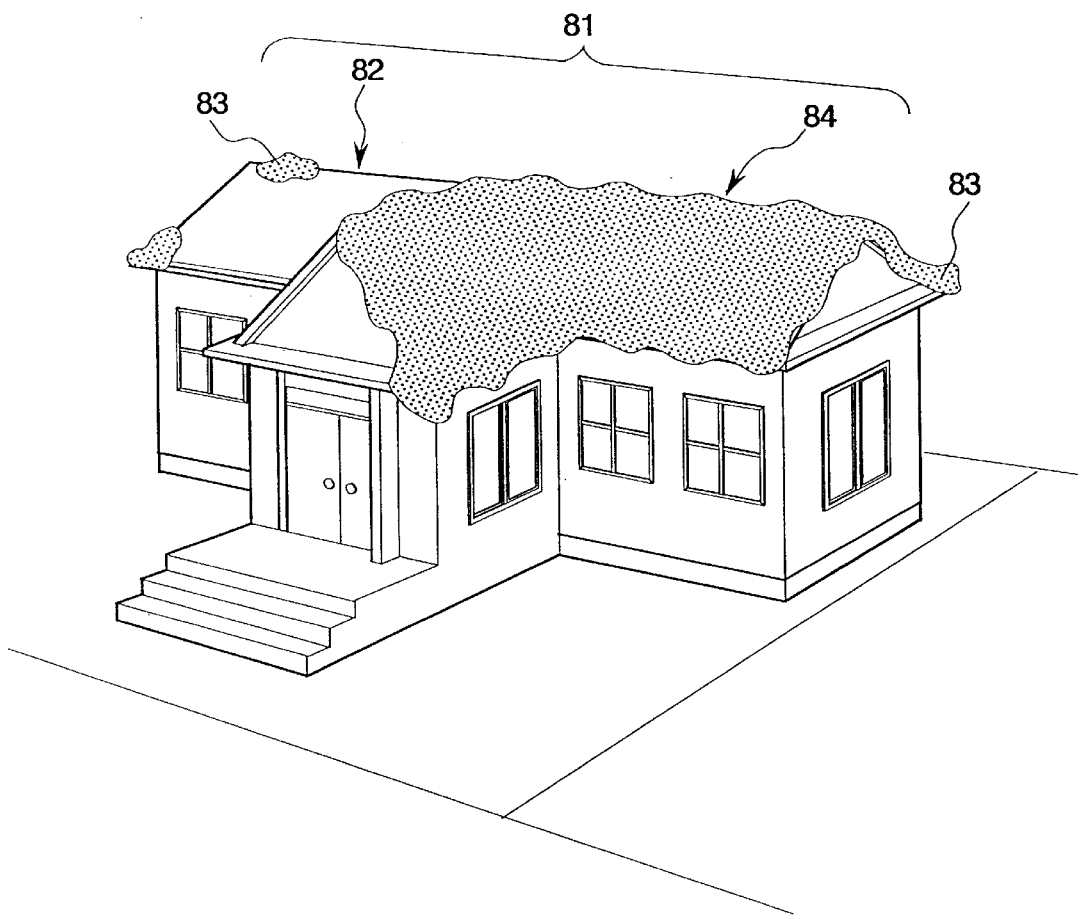
FIG. 10 is a schematic perspective view showing a house with a roof having a coated portion according to an embodiment of the present invention and a comparative uncoated portion.

The water repellent coating compositions of Examples 1 to 9 each were coated onto a roof of a house as shown in a schematic perspective view in FIG. 10. In FIG. 10, reference numeral 81 is a roof of a house, 82 is a coated portion of the roof 81, 83 is snow or ice, and 84 is an uncoated portion of the roof 81. As shown, snow or ice 83 deposited only in a small amount on the coated portion 82 (left hand side in FIG. 10) while it deposited in large amount all over the uncoated portion to a thickness of about 50 cm.

Example 17
Railroad Train

Figure 11:
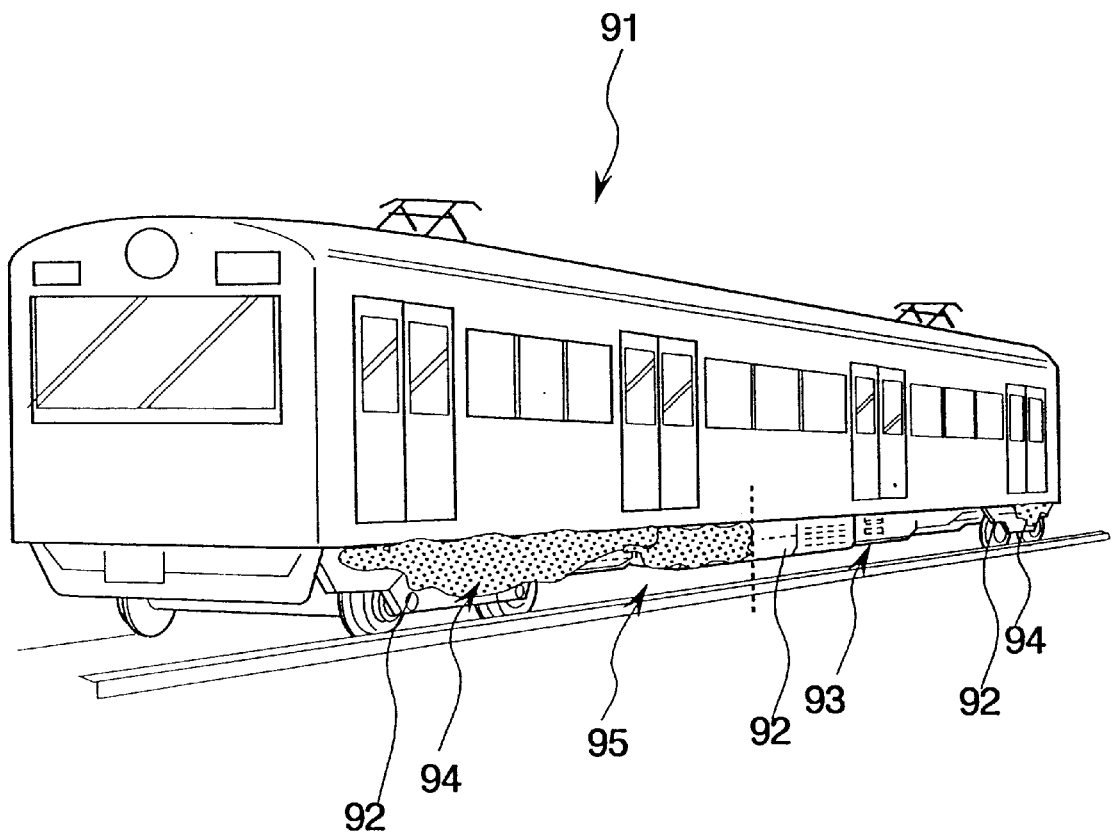
FIG. 11 is a schematic perspective view showing a rail road train with a lower cover having a coated portion according to an embodiment of the present invention and a comparative uncoated portion.

The water repellent coating compositions of Examples 1 to 9 each were coated onto a lower side guard plate of a railroad train as shown in a schematic perspective view in FIG. 11. In FIG. 11, reference numeral 91 designates a train (electric car), 92 is a lower part of the train 91, 93 is coated portion of the lower part of the train, 94 is snow or ice, and 95 is an uncoated portion of the lower portion of the train. As shown, in the case of the coated portion 93 (right hand side in FIG. 11), only a small amount of snow or ice 94 deposited only a rear region (as viewed in the direction of movement of the train or right hand side in FIG. 11) of the coated portion 93. On the contrary, in the case of the uncoated portion 95, snow or ice 94 deposited almost all over the uncoated portion.

Example 18
Outer Surface of Truck

Figure 12:
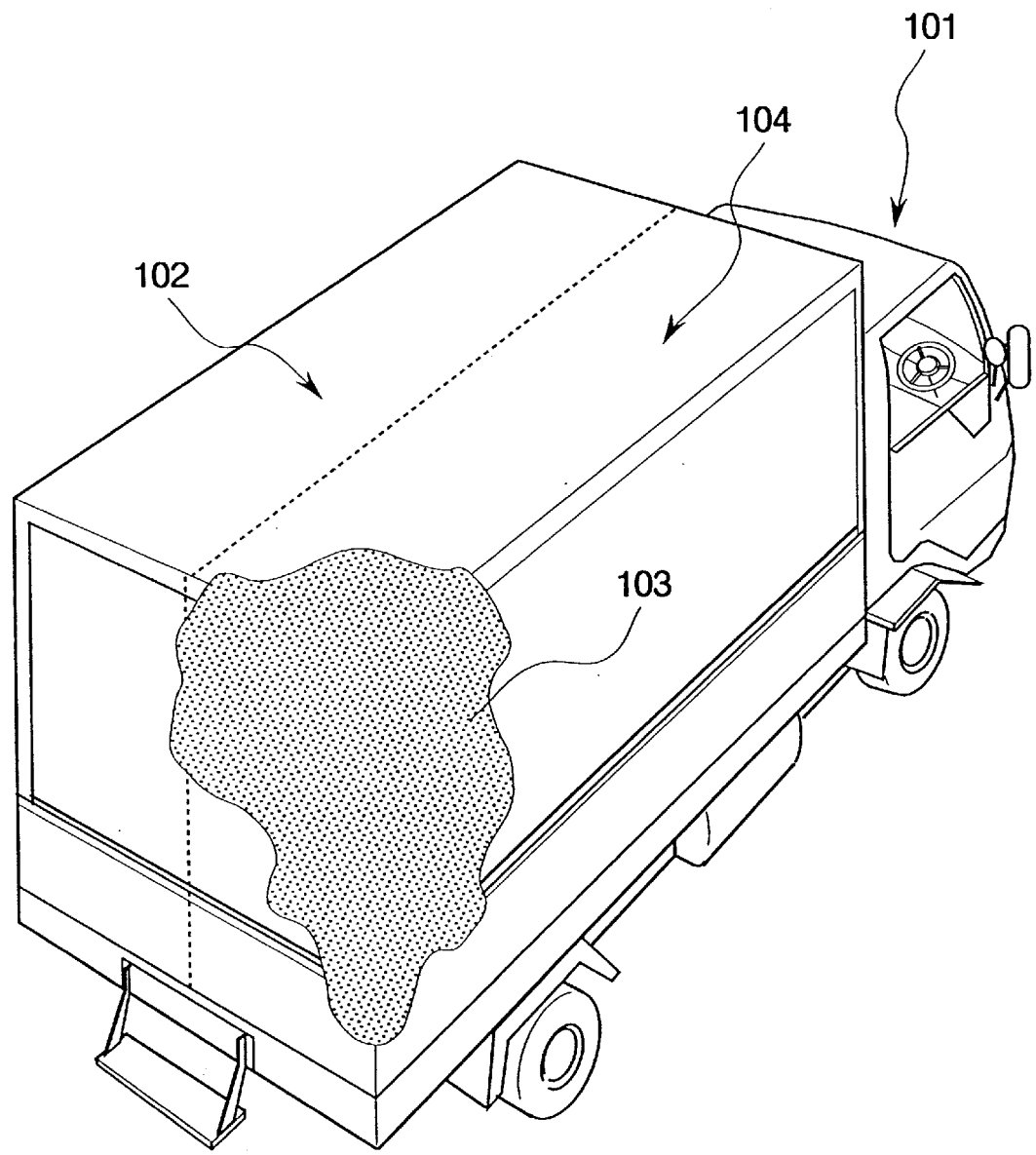
FIG. 12 is a schematic perspective view showing a truck having a coated portion according to an embodiment of the present invention and a comparative uncoated portion.

The water repellent coating compositions of Examples 1 to 9 each were coated onto an outer surface of a truck as shown in a schematic perspective view in FIG. 12. In FIG. 12, reference numeral 101 designates a truck, 102 is a coated portion of the outer surface of the truck, 103 is snow or ice, 104 is an uncoated portion of the outer surface of the truck. The outer surface of the truck was divided into two areas, i.e., coated and uncoated areas, by an imaginary central line as indicated in dotted line. As shown in FIG. 12, the coated portion 102 had substantially no snow or ice deposited thereon in contrast to the uncoated portion 104 where much snow or ice 103 deposited on the rear portion.

Example 19
Ship

Figure 13:
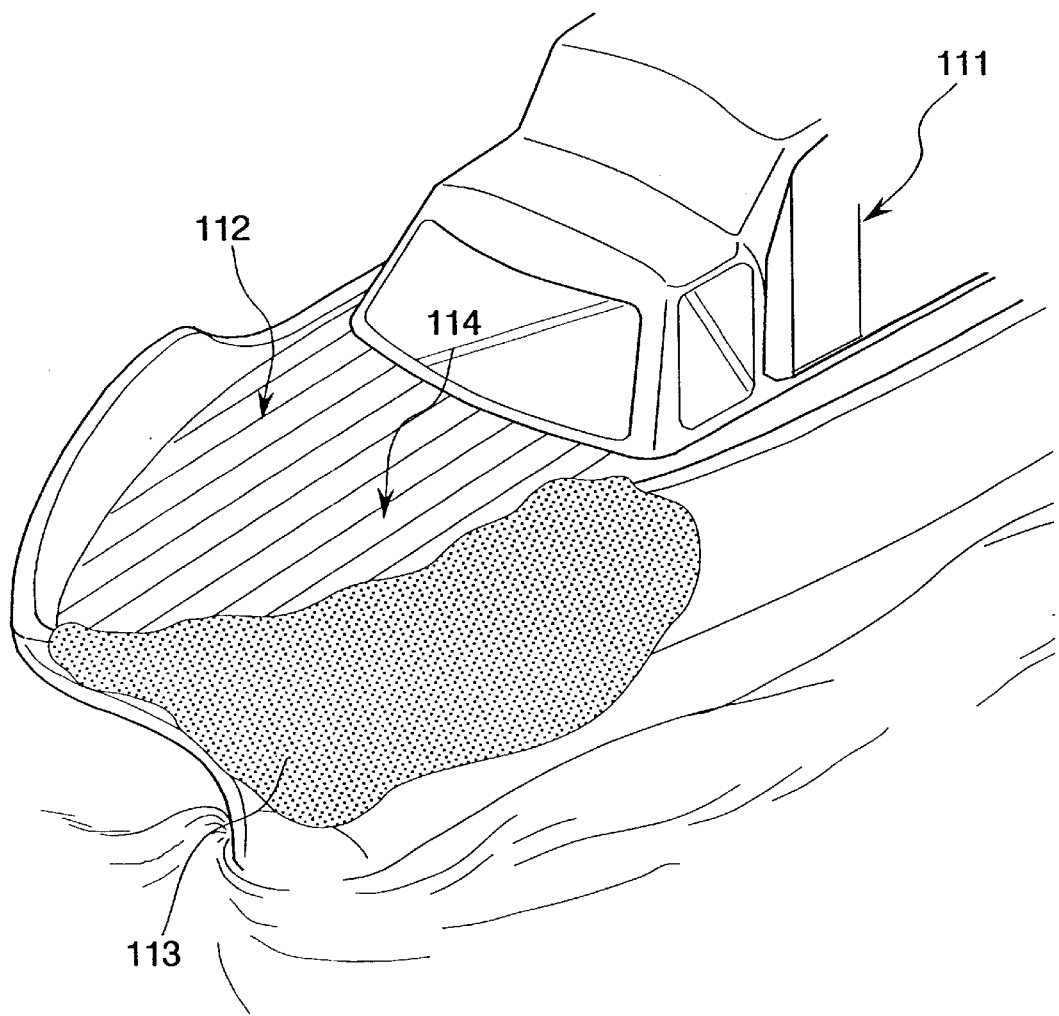
FIG. 13 is a schematic perspective view showing a ship having a coated portion according to an embodiment of the present invention and a comparative uncoated portion.

The water repellent coating compositions of Examples 1 to 9 each were coated onto a surface of a ship as shown in a schematic perspective view in FIG. 13. In FIG. 13, reference numeral 111 designates a ship, 112 is a coated portion of the ship surface, 113 snow or ice, and 114 is an uncoated portion of the ship surface. When the ship 111 was sailing in Northern seas in winter, as shown in FIG. 13, the coated portion 112 had substantially no snow or ice 113 whereas the uncoated portion 114 had much snow or ice thereon downward close to the water line.

Example 20
Signal Lamp

Figure 14:
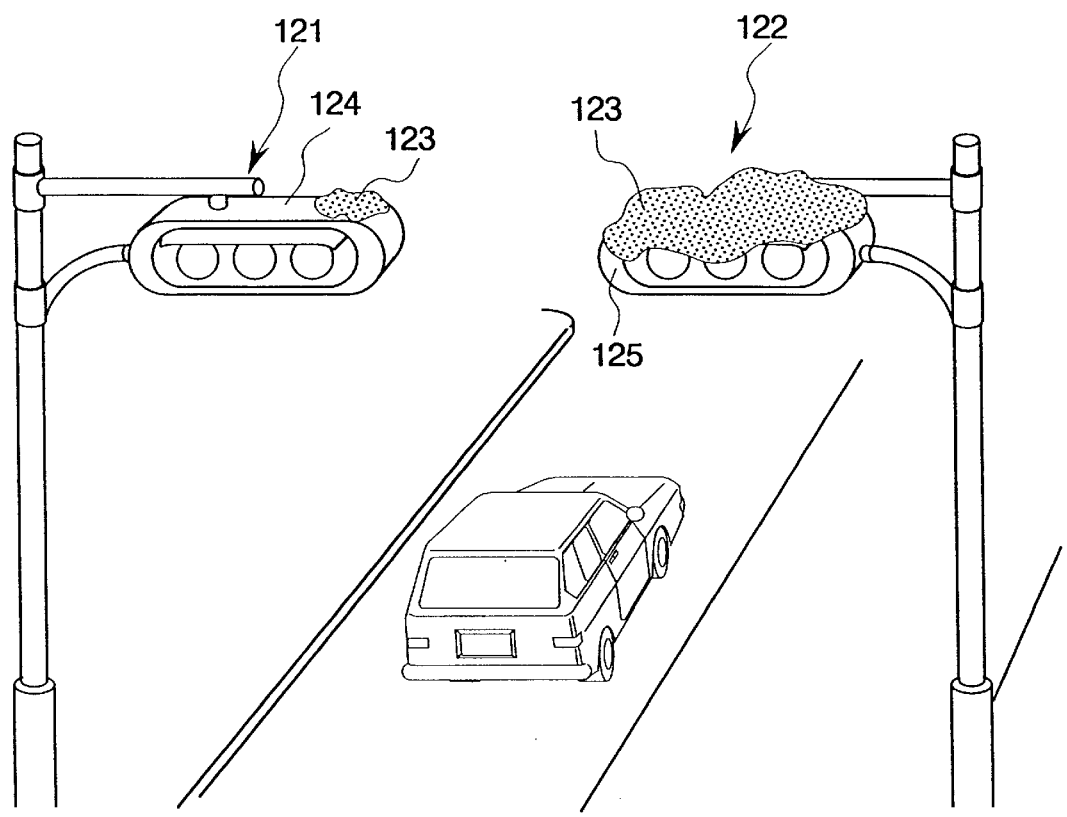
FIG. 14 is a schematic perspective view showing a signal having a coated hood according to an embodiment of the present invention and a comparative signal having an uncoated hood.
Figure 15:
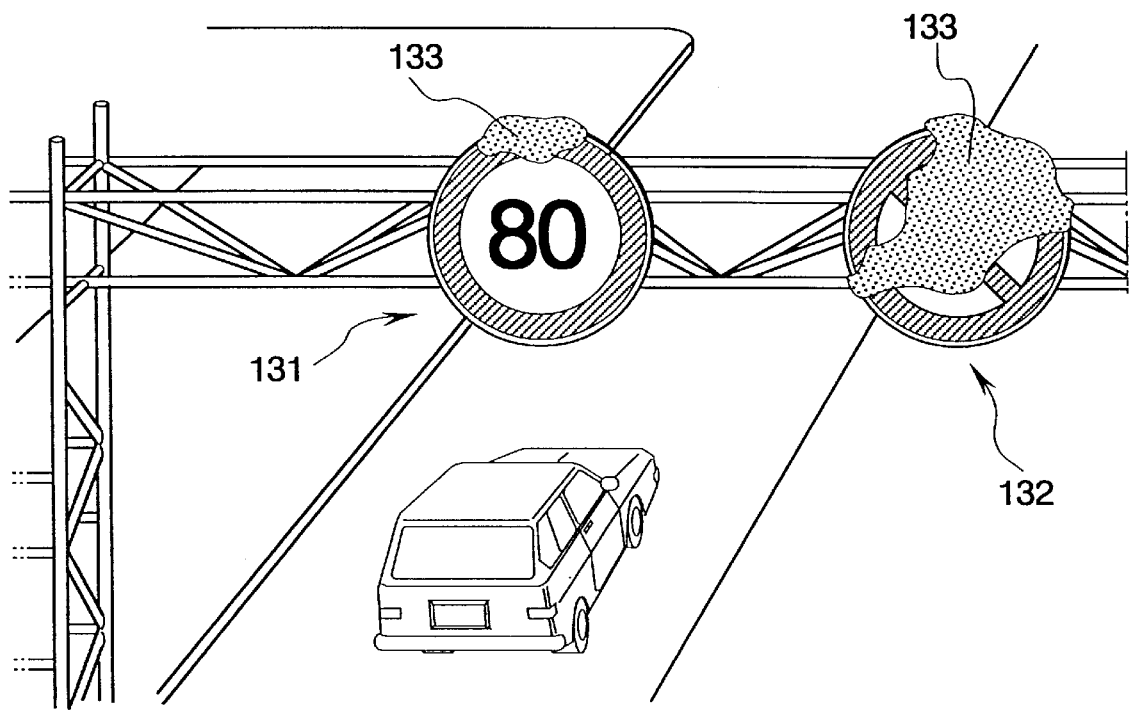
FIG. 15 is a schematic perspective view showing a coated mark plate according to an embodiment of the present invention and a comparative uncoated mark plate.

The water repellent coating compositions of Examples 1 to 9 each were coated onto a signal lamp as shown in a schematic perspective view in FIG. 14. In FIG. 14, reference numeral 121 designates a coated signal lamp, 122 is an uncoated signal lamp, 123 is snow or ice, and 124 is a hood of each of the signal lamps 121 and 122. As shown in FIG. 15, the hood 124 of the coated signal lamp 121 had only a small amount of snow or ice 123 on a part of thereof whereas the hood 124 of the uncoated signal lamp 122 had much snow or ice 123 all over it, with the mass of snow or ice 123 extending outwards from the hood 124.

Example 21
Traffic Control Sign Plate

The water repellent coating compositions of Examples 1 to 9 each were coated onto a traffic control sign plate as shown in a schematic perspective view in FIG. 15. In FIG. 15, reference numeral 131 designates a coated traffic control sign plate, 132 is an uncoated traffic control sign plate, and 133 is snow or ice. As shown in FIG. 15, the coated traffic control sign plate 131 had only a small amount of snow or ice 133 on its upper portion while snow or ice 133 deposited on most of the surface of the uncoated traffic control sign plate 132, making it difficult to see the signal clearly.

Example 22
Front Window Glass

Figure 16:
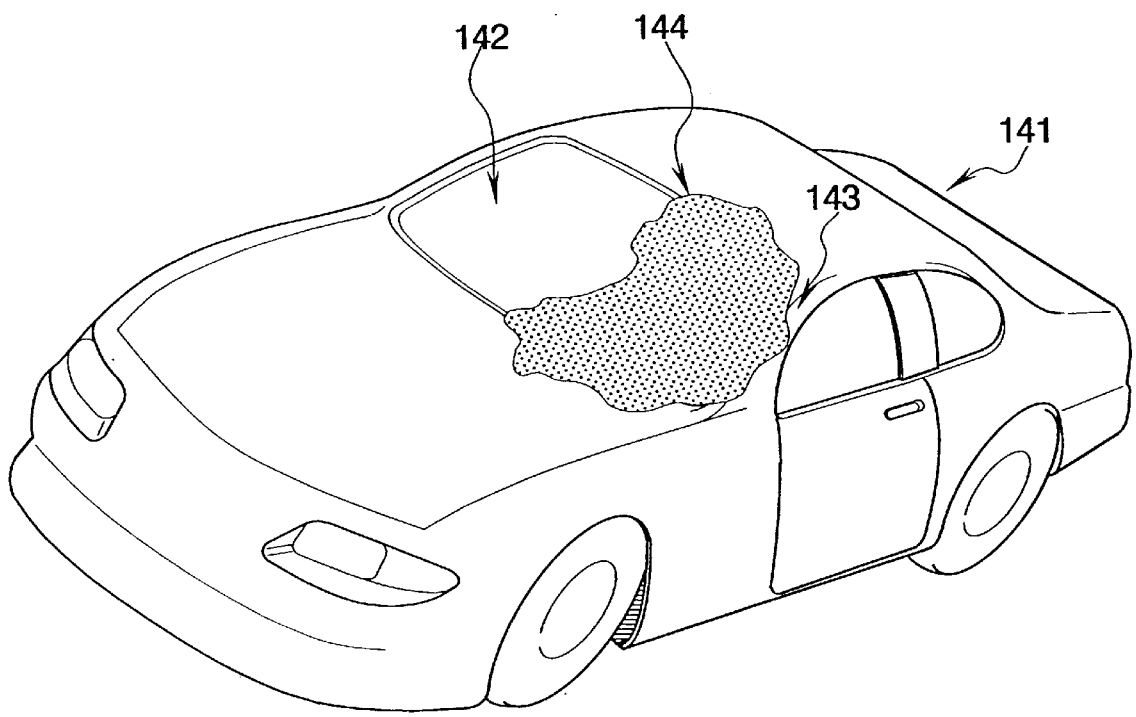
FIG. 16 is a schematic perspective view showing a front window glass according to an embodiment of the present invention.

The water repellent coating compositions of Examples 6 to 9 each were coated onto a front window glass of a car 141 as shown in FIG. 16 on one side of the two areas divided by a center line of the window glass. The film thickness was 3 $\mu$m and the coated portion 142 had a light transmittance of 85%. As shown in FIG. 16, substantially no snow, ice or rain drops adhered on the coated portion 142 on the left hand side whereas a large amount of snow or rain drops 144 adhered on the uncoated portion 143. Similar tests were conducted for front window glass of a ship and manipulation room of an airplane, and similarly good results were obtained.

Example 23
Body of Airplane

Figure 17:
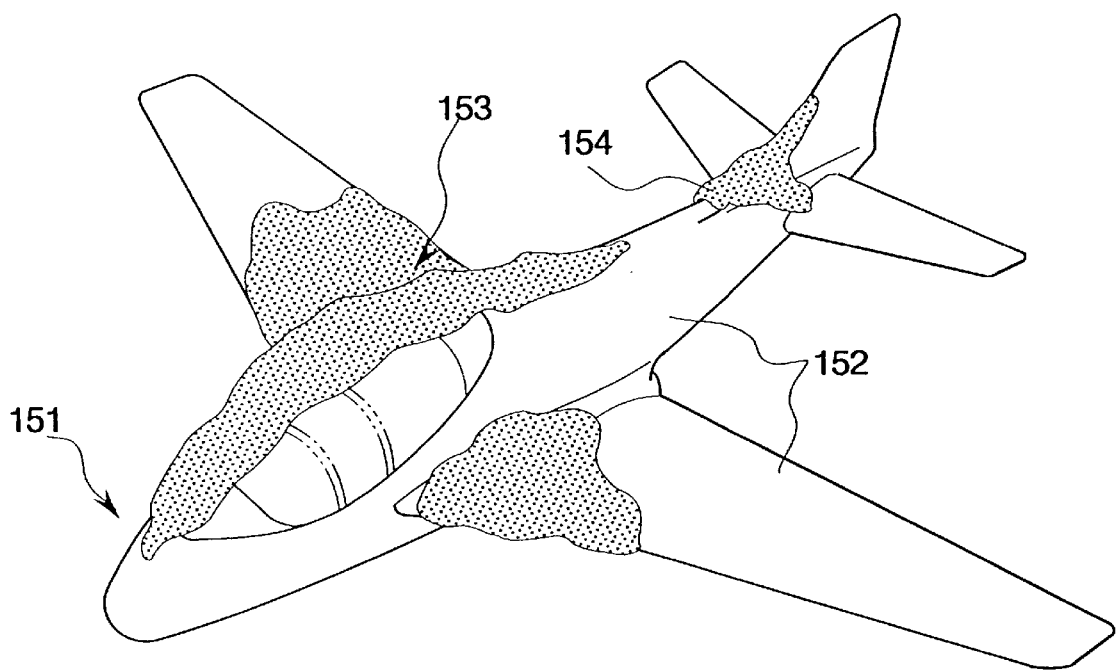
FIG. 17 is a schematic perspective view showing a body of an airplane coated with a coating composition according to an embodiment of the present invention.

The water repellent coating compositions of Examples 6 to 9 each were coated onto the body 151 of an airplane shown in FIG. 17. The coating film had a thickness of about 30 $\mu$m and a hardness of 2H in terms of pencil hardness. Test flight of the airplane coated with the coating composition of the present invention was conducted in the route of Tokyo-London-Tokyo. The coated portion 152 suffered no adhesion of snow or ice during the flight. On the contrary, much snow or ice 154 adhered to the uncoated portion 153 and use of heater was needed to melt the snow or ice for stable flight. Investigation of the condition of the surface of coating film after the flight was over indicated that the surface of coating film suffered substantially no harm and maintained the original properties.

Example 24
Clothing

Figure 18:
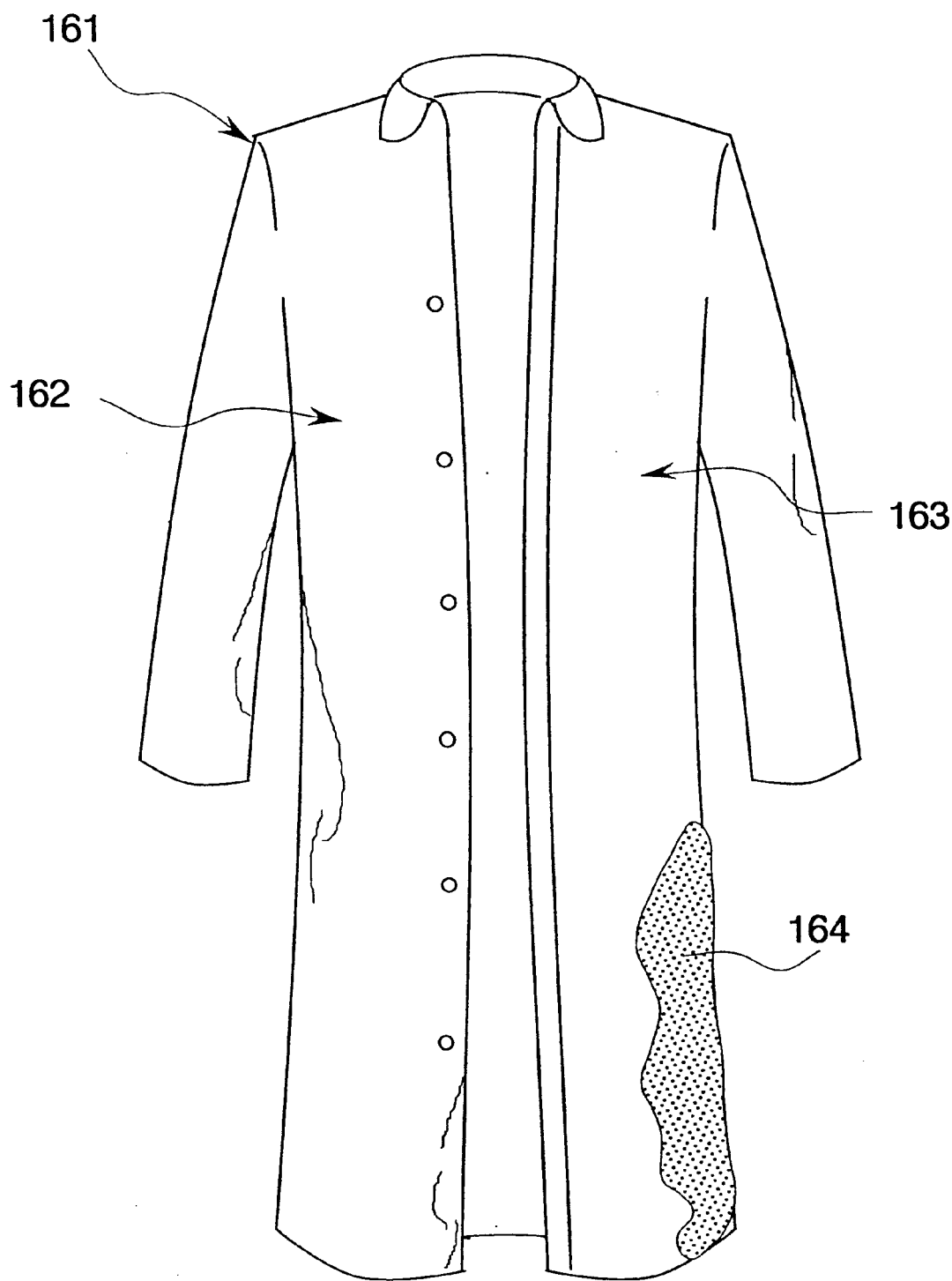
FIG. 18 is a schematic perspective view showing a smock coated with a coating composition according to an embodiment of the present invention.

The water repellent coating compositions of Examples 1 to 9 each were coated onto white smock for laboratory use, jumper coat for general purpose and a swimming suit as examples of clothing. FIG. 18 shows an example of white smock for laboratory use. The white smock was coated by spraying or dipping in the coating composition. When water droplets were blown onto the closing 161, the coated portion 162 of the smock repelled water quite well and did not get wetted. The contact angle was no smaller than 150°. The coating film had an excellent adhesion strength and the water repellent performance was not deteriorated after cleaning process. On the contrary, considerable wetting 164 with water was observed on the uncoated portion 163.

Example 25
Cloth of Tent

Figure 19:
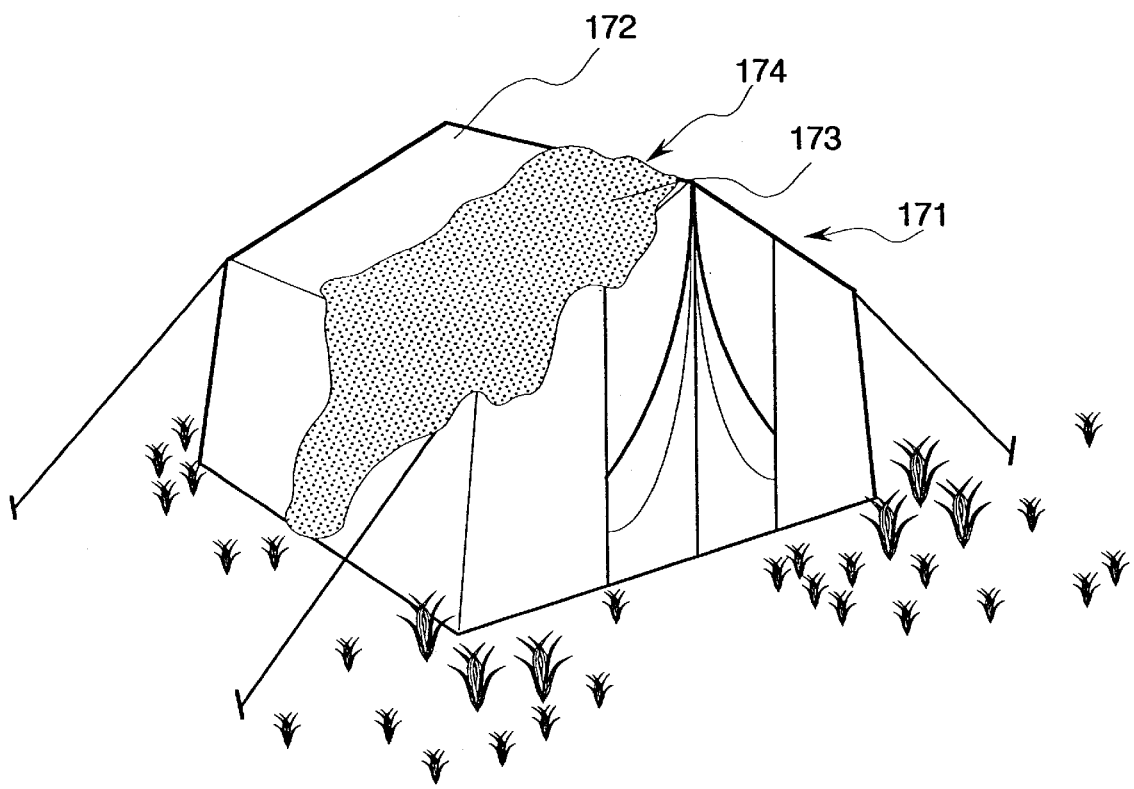
FIG. 19 is a schematic perspective view showing a cloth for tent coated with a coating composition according to an embodiment of the present invention.

The water repellent coating compositions of Examples 1 to 9 each were coated onto a cloth/sheet 171 of a tent as shown in FIG. 19 and the tent was placed outdoors and exposed to ambient conditions for 3 months. The coated portion 172 of the cloth/sheet repelled rain drops well from the surface of the tent and did not get wetted at all. In the case of snow falling, no snow or ice 173 adhered to the surface of the tent. After 3 months no deterioration of the performance of the coating film was observed. In contrast, a considerable amount of snow or ice 173 adhered to the uncoated portion 174.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A water repellent coating composition, comprising:
fine particles which comprise an organic material, said fine particles having functional groups on their surfaces and having a particle diameter ranging from 10 nm to 1 mm;
a coupling agent containing (a) a functional group which is capable of reacting with the functional group of said fine particles and (b) a water repellent fluorinated group;
a binder resin for binding said fine particles; and
a solvent for said binder,
wherein said organic material is selected from the group consisting of polymethyl methacrylate, polyurethane resin and mixtures thereof.

2. The water repellent coating composition as claimed in claim 1, wherein said coupling agent is selected from the group consisting of a silane coupling agent having the fluorinated group in its molecule, an aluminum based coupling agent having the fluorinated group in its molecule, and a titanium coupling agent having the fluorinated group in its molecule, and mixture thereof.

3. The water repellent coating composition as claimed in claim 1, wherein said binder resin is selected from the group consisting of acrylic resin, acrylic silicone resin, acrylic urethane resin, polyester resin, epoxy resin, urethane resin, fluororesin, and mixture thereof.

4. A coated film obtained from a water repellent coating composition as claimed in claim 1.

5. A coated article, comprising:
a substrate;
a coating film obtained from a water repellent coating composition as claimed in claim 1.

6. A transparent water repellent coating composition, comprising:
fine particles which comprise an organic material, said fine particles having functional groups on their surfaces and having a particle diameter ranging from 10 nm to 1 mm;
a coupling agent containing (a) a functional group which is capable of reacting with the functional group of said fine particles and (b) a water repellent fluorinated group;
a binder resin for binding said fine particles; and
a solvent for said binder;
where said fine particles differ from said binder resin in refractive index within ±2% based on the refractive index of said fine particles, and said organic material of said fine particles is selected from the group consisting of polymethyl methacrylate, polyurethane resin, and mixtures thereof.

7. The transparent water repellent coating composition as claimed in claim 6, wherein said fine particles are present in an amount ranging from 10 to 90% based on the weight of the composition after evaporation of said solvent.

8. A method of preparing a transparent water repellent coating composition as claimed in claim 6, comprising the step of:
treating surfaces of fine particles with a coupling agent containing a water repellent fluorinated group.

9. The method as claimed in claim 8, wherein said fine particles are present in an amount ranging from 10 to 90% based on the weight of the composition after evaporation of said solvent.

10. A method of preparing a transparent water repellent coating composition as claimed in claim 6, comprising the step of:
mixing said fine particles and said binder in an apparatus utilizing high speed turbulent flow energy.

11. The method as claimed in claim 10, wherein said fine particles are present in an amount ranging from 10 to 90% based on the weight of the composition after evaporation of said solvent.

12. A method of preparing a transparent water repellent coating composition as claimed in claim 6, comprising the steps of:
treating surfaces of fine particles with a coupling agent; and
mixing said fine particles and said binder in an apparatus utilizing high speed turbulent flow energy.

13. The method as claimed in claim 6, wherein said fine particles are present in an amount ranging from 10 to 90% based on the weight of the composition after evaporation of said solvent.

14. A coated film obtained from a water repellent coating composition as claimed in claim 6.

15. A coated article, comprising:
a substrate; and
a coating film obtained from a water repellent coating composition as claimed in claim 6.

16. A water repellent coating composition, comprising:
fine particles which comprise an inorganic material and an organic material in combination, said particles having functional groups on their surfaces and having a particle diameter ranging from 10 nm to 1 mm;
a coupling agent containing (a) a functional group which is capable of reacting with the functional group of said fine particles and (b) a water repellent fluorinated group;
a binder resin for binding said fine particles; and
a solvent for said binder,
wherein said inorganic material is selected form the group consisting of $SiO_2$, $SiO_2$ containing glass, shirasu, siliceous sand, zeolite, silicon carbide, and mixtures thereof, and said organic material is selected from the group consisting of polymethyl methacrylate, polyuretane resin, and mixture thereof.

17. The water repellent coating composition as claimed in claim 16, wherein said coupling agent is selected from the group consisting of a silane coupling agent having the fluorinated group in its molecule, an aluminum based coupling agent having the fluorinated group in its molecule, and a titanium coupling agent having the fluorinated group in it molecule, and mixture thereof.

18. The water repellent coating composition as claimed in claim 16, wherein said binder resin is selected from the group consisting of acrylic resin, acrylic silicone resin, acrylic urethane resin, polyester resin, epoxy resin, urethane resin, fluororesin, and mixture thereof.

19. A coated film obtained from a water repellent coating composition as claimed in claim 16.

20. A coated article, comprising:
a substrate; and
a coating film obtained from a water repellent coating composition as claimed in claim 16.

21. A transparent water repellent coating composition, comprising:
fine particles which comprise an inorganic material and an organic material in combination, said particles having functional groups on their surfaces and having a particle diameter ranging from 10 nm to 1 mm;
a coupling agent containing (a) a functional group which is capable of reacting with the functional group of said fine particles and (b) a water repellent fluorinated group;

a binder resin for binding said fine particles; and a solvent for said binder;

wherein said fine particles differ from said binder resin in refractive index within ±2% based on the refractive index of said fine particles, and said inorganic material of said fine particles is selected from the group consisting of $SiO_2$, $SiO_2$ containing glass, shirasu, siliceous sand, zeolite, silicon carbide, and mixtures thereof, and said organic material of said fine particles is selected from the group consisting of polymethyl methacrylate, polyuretane resin, and mixture thereof.

22. The transparent water repellent coating composition as claimed in claim 21, wherein said fine particles are present in an amount ranging from 10 to 90% based on the weight of the composition after evaporation of said solvent.

23. A method of preparing a transparent water repellent coating composition as claimed in claim 21, comprising the step of:

treating surfaces of fine particles with a coupling agent containing a water repellent fluorinated group.

24. The method as claimed in claim 23, wherein said fine particles are present in an amount ranging from 10 to 90% based on the weight of the composition after evaporation of said solvent.

25. A method of preparing a transparent water repellent coating composition as claimed in claim 21, comprising the step of:

mixing said fine particles and said binder in an apparatus utilizing thigh speed turbulent flow energy.

26. The method as claimed in claim 25, wherein said fine particles are present in an amount ranging from 10 to 90% based on the weight of the composition after evaporation of said solvent.

27. A method of preparing a transparent water repellent coating composition as claimed in claim 21, comprising the steps of:

treating surfaces of fine particles with a coupling agent; and mixing said fine particles and said binder in an apparatus utilizing high speed turbulent flow energy.

28. The method as claimed in claim 27, wherein said fine particles are present in an amount ranging from 10 to 90% based on the weight of the composition after evaporation of said solvent.

29. A coated film obtained from a water repellent coating composition as claimed in claim 21.

30. A coated article, comprising:

a substrate; and a coating film obtained from a water repellent coating composition as claimed in claim 21.

* * * * *